(12) United States Patent
Onodera et al.

(10) Patent No.: US 8,343,413 B2
(45) Date of Patent: Jan. 1, 2013

(54) METHOD FOR MANUFACTURING MOLDED FOAM

(75) Inventors: Masaaki Onodera, Kanagawa (JP); Teruo Tamada, Kanagawa (JP); Tatsuya Fukuda, Kanagawa (JP); Yu Igarashi, Kanagawa (JP); Yoshinori Ohno, Kanagawa (JP)

(73) Assignee: Kyoraku Co. Ltd., Kyoto-Shi (JP)

( * ) Notice: Subject to any disclaimer, the term of this patent is extended or adjusted under 35 U.S.C. 154(b) by 114 days.

(21) Appl. No.: 12/913,003

(22) Filed: Oct. 27, 2010

(65) Prior Publication Data

US 2011/0101558 A1    May 5, 2011

(30) Foreign Application Priority Data

Oct. 30, 2009   (JP) ................................. 2009-250142
Nov. 30, 2009   (JP) ................................. 2009-272748

(51) Int. Cl.
*B29C 44/50* (2006.01)
*B29C 44/34* (2006.01)
(52) U.S. Cl. ........................... 264/547; 264/553; 264/48
(58) Field of Classification Search .................. 425/503, 425/504, 519; 264/526, 547, 566, 48, 553
See application file for complete search history.

(56) References Cited

U.S. PATENT DOCUMENTS

| | | | | | |
|---|---|---|---|---|---|
| 3,982,877 | A | * | 9/1976 | Wyeth et al. ................... | 425/503 |
| 4,086,314 | A | * | 4/1978 | Lampart et al. ................ | 264/526 |
| 4,192,701 | A | * | 3/1980 | Martin et al. .................. | 156/285 |
| 4,504,341 | A | * | 3/1985 | Radzwill et al. ............... | 156/102 |
| 6,029,962 | A | * | 2/2000 | Shorten et al. ................. | 267/145 |
| 6,592,358 | B2 | * | 7/2003 | Iwasaki ......................... | 425/525 |

FOREIGN PATENT DOCUMENTS

| | | |
|---|---|---|
| JP | 10-058533 | 3/1998 |
| JP | 2003-236918 | 8/2003 |
| JP | 2004-082332 | 3/2004 |
| JP | 2004-284149 | 10/2004 |

* cited by examiner

*Primary Examiner* — Joseph Del Sole
*Assistant Examiner* — Kimberly A Stewart
(74) *Attorney, Agent, or Firm* — Lowe Hauptman Ham & Berner, LLP

(57) ABSTRACT

An object of the invention is to provide a method for manufacturing a molded foam which is lightweight and excellent in strength. According to the invention, a method for manufacturing a molded foam from a foamed parison includes: an extruding step of extruding a resin blend containing a foaming agent and a thermoplastic resin to form a foamed parison; an attaching step of closely attaching facing portions of an inner wall surface of the foamed parison to each other to form a foamed parison laminated body; a mold clamping step of sealing and mold clamping the foamed parison laminated body by clamping the foamed parison laminated body by split mold blocks; and a sucking step of sucking air between the split mold blocks to reduce a pressure between the split mold blocks, after the attaching step and the mold clamping step.

17 Claims, 19 Drawing Sheets

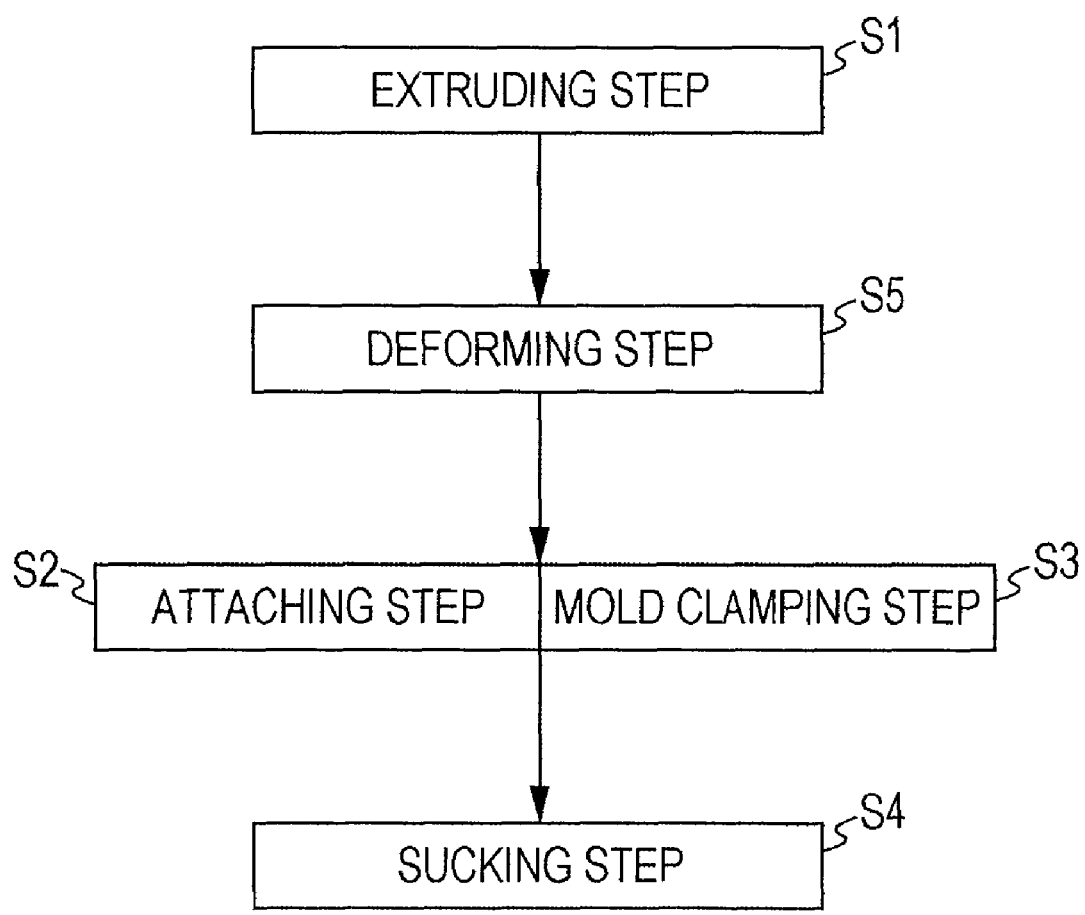

METHOD FOR MANUFACTURING MOLDED FOAM

CROSS-REFERENCE TO RELATED APPLICATIONS

This application is based on Japanese Patent Application Nos. 2009-250142 and 2009-272748 filed with the Japan Patent Office on Oct. 30, 2009, the entire contents of which are hereby incorporated by reference.

BACKGROUND

1. Technical Field

The present invention relates to a method for manufacturing a molded foam.

2. Related Art

A molded foam is lightweight and excellent in rigidity, and therefore is utilized in various different fields for automobiles, aircrafts, vehicles and ships, architectural materials, electrical appliance housings, sports and leisure products, and the like.

According to one known method for manufacturing a molded foam, for example, polymer containing a thermoplastic resin as a main component is melted and kneaded in an extruder. Then, the resin is formed into a sheet shape by extruding through a circle-shaped die, and transferred by a transfer table. Subsequently, secondary foaming is performed by vacuum sucking the sheet-shaped resin using a vacuum suction apparatus to produce a molded foam (e.g., refer to Patent Document 1).

Further, there is known a method of obtaining a molded foam by providing a cylinder-shaped molded body including a thermoplastic resin foamed layer in a softened state (parison) between split mold blocks, clamping the split mold blocks with the cylinder-shaped molded body inserted therebetween, and compressing the cylinder-shaped molded body (e.g., refer to Patent Document 2, 3 or 4).

According to these methods, a molded foam is manufactured by blowing air into a parison and/or reducing a pressure between an outer surface of the parison and an internal surface of the mold block.

The documents that describe the related art are listed below.

Patent Document 1: JP 10-058533 A
Patent Document 2: JP 2003-236918 A
Patent Document 3: JP 2004-082332 A
Patent Document 4: JP 2004-284149 A However, in the methods for manufacturing a molded foam described in Patent Documents 1 to 4, when a parison is inserted between split mold blocks without closely attaching a wall surface of the parison, a hollow portion (hereinafter referred to as "a hollow part") can be easily formed within the parison. In this case, a structure of a molded foam 50 that is obtained partially includes a hollow part 51 as illustrated in FIG. 20. As a result, a strength (such as impact resistance) of the molded foam becomes insufficient.

SUMMARY

The present invention is made in view of the circumstances described above, and an object thereof is to provide a method for manufacturing a molded foam which is lightweight and excellent in strength.

The present inventors have devoted to find solutions to the problems described above, found that it is possible to solve the problems by providing an attaching step of forming a foamed parison laminated body by closely attaching facing portions of an inner wall surface of a foamed parison to each other, and thus perfected the present invention.

Specifically, the present invention provides a method for manufacturing a molded foam from a foamed parison, and this method includes: an extruding step of extruding a resin blend containing a foaming agent and a thermoplastic resin to form a foamed parison; an attaching step of closely attaching facing portions of an inner wall surface of the foamed parison to each other to form a foamed parison laminated body; a mold clamping step of sealing and mold clamping the foamed parison laminated body by clamping the foamed parison laminated body by split mold blocks; and a sucking step of sucking air between the split mold blocks to reduce a pressure between the split mold blocks.

The method for manufacturing a molded foam according to the present invention includes the attaching step in which the facing portions of the inner wall surface of the foamed parison are reliably closely attached to each other to form the foamed parison laminated body. Thus, it is possible to suppress generation of a hollow part. Consequently, the molded foam obtained by the method for manufacturing a molded foam is excellent in strength while being lightweight.

Further, according to the method for manufacturing a molded foam, the portions of the inner wall surface that are laminated in the mold clamping step are not easily separated by performing the attaching step. Consequently, it is possible to make the entire molded foam to have a sufficient foaming state since the expansion ratio can be increased. Thus, it is possible to further reduce the weight of the molded foam.

BRIEF DESCRIPTION OF THE DRAWINGS

The foregoing and other objects, features, aspects and advantages of the invention will become more apparent from the following detailed description when taken in conjunction with the accompanying drawings, in which:

FIG. 7 is a flowchart of a method for manufacturing a molded foam according to a second embodiment;

DESCRIPTION OF EMBODIMENTS

Figure 1:
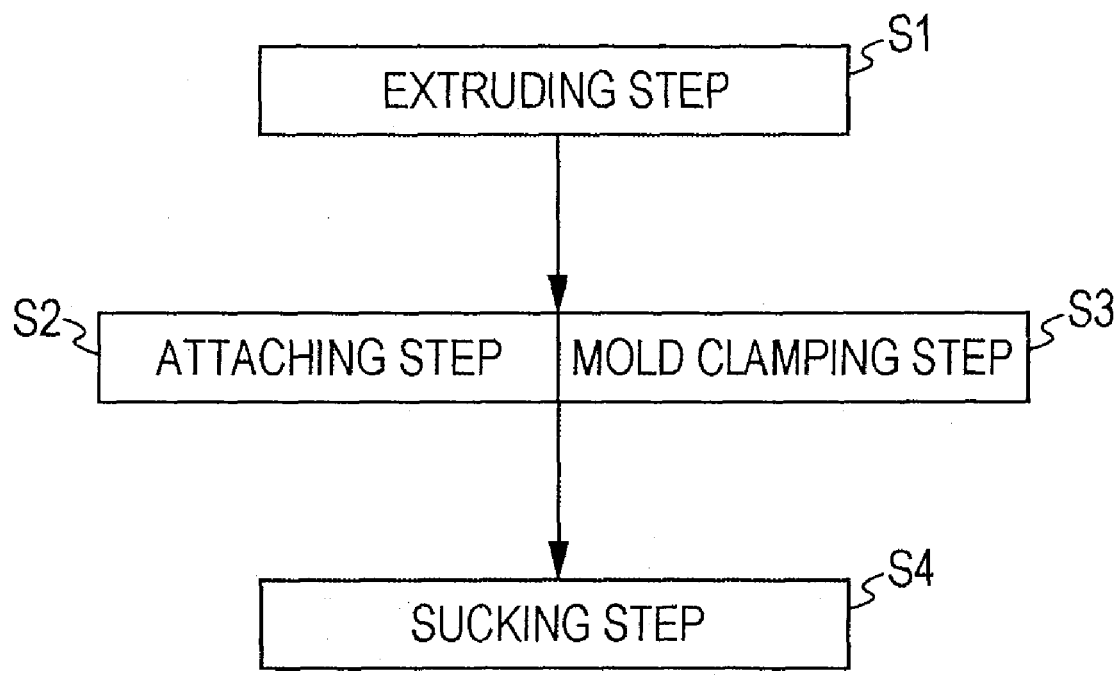
FIG. 1 is a flowchart of a method for manufacturing a molded foam according to a first embodiment.

The following describes preferred embodiments according to the present invention in detail with reference to the drawings as needed. In the drawings, like components are denoted by like reference numerals, and overlapping descriptions for these components will be omitted. Unless otherwise stated, positional relations such as up (top), down (bottom), left and right are based on positional relations illustrated in the drawings. Further, dimensional ratios of the components illustrated in the drawings are not limited to those illustrated in the drawings.

First Embodiment

The following describes a first embodiment of a method for manufacturing a molded foam according to the present invention, taking an example in which a cylinder-shaped foamed parison is used.

FIG. 1 is a flowchart of the method for manufacturing a molded foam according to the first embodiment.

Referring to FIG. 1, the method for manufacturing a molded foam according to the first embodiment includes an extruding step S1, an attaching step S2, a mold clamping step S3, and a sucking step S4. In the extruding step S1, a cylinder-shaped foamed parison in a cylinder shape is formed by extruding a resin blend containing a foaming agent and a thermoplastic resin. In the attaching step S2, facing portions of an inner wall surface of the cylinder-shaped foamed parison are closely attached to each other, so that a foamed parison laminated body is formed. In the mold clamping step S3, sealing and mold clamping are performed to the foamed parison laminated body by clamping the foamed parison laminated body by split mold blocks. In the sucking step S4, air between the split mold blocks is sucked to reduce a pressure between the split mold blocks. As will be described later, in the method for manufacturing a molded foam according to the first embodiment, the attaching step S2 and the mold clamping step S3 are performed at the same time. Specifically, the extruding step S1, the attaching step S2 and the mold clamping step S3 (simultaneous), and the sucking step S4 are performed in the stated order.

According to the method for manufacturing a molded foam described above, it is possible to manufacture a molded foam which is lightweight and excellent in strength (including no hollow part).

In the following, each of the steps will be described in further detail.

(Extruding Step)

The extruding step S1 is a step in which the cylinder-shaped foamed parison in the cylinder shape is formed by extruding the resin blend containing the foaming agent and the thermoplastic resin through an extrusion outlet.

Figure 2:
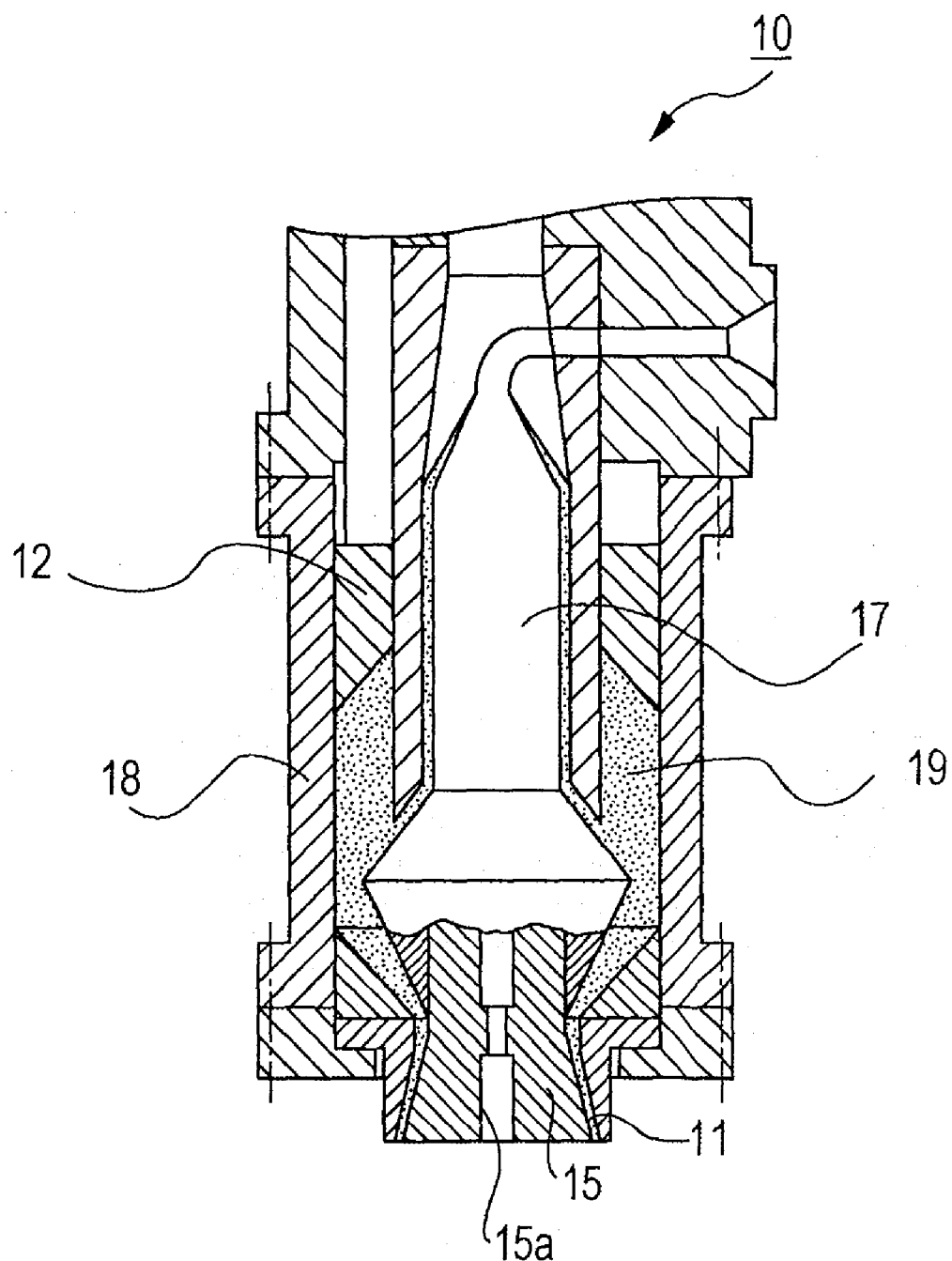
FIG. 2 is a partial sectional view illustrating a die used in the method for manufacturing a molded foam according to the first embodiment.
Figure 3:
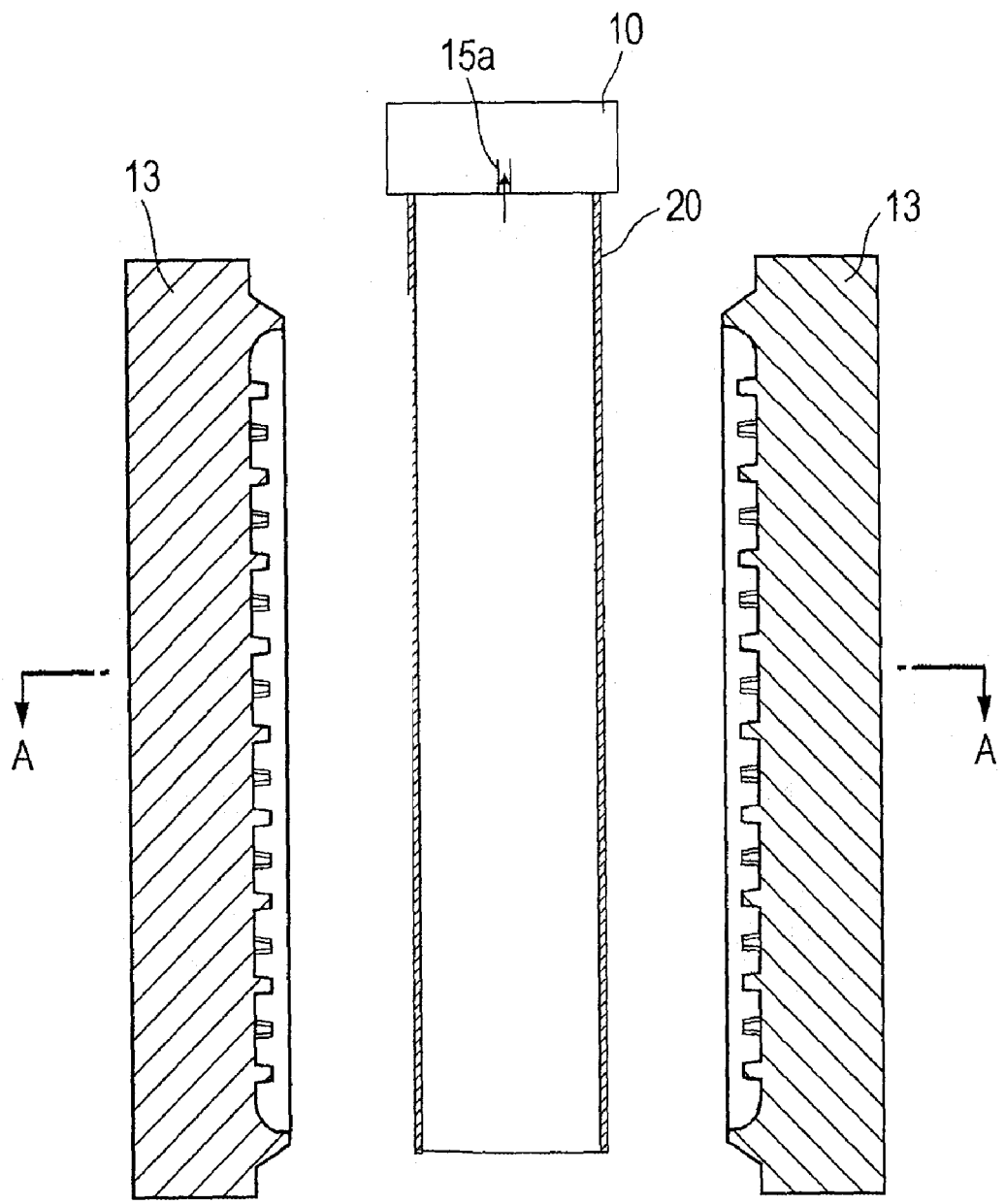
FIG. 3 is a vertical sectional view illustrating a state in which a cylinder-shaped foamed parison is extruded between split mold blocks in the method for manufacturing a molded foam according to the first embodiment.

FIG. 2 is a partial sectional view illustrating a die used in the method for manufacturing a molded foam according to the first embodiment. FIG. 3 is a vertical sectional view illustrating a state in which the cylinder-shaped foamed parison is extruded between the split mold blocks in the method for manufacturing a molded foam according to the first embodiment.

Referring to FIG. 2, a die 10 includes a die external cylinder 18, a mandrel 17 disposed at the substantial center of the die external cylinder 18, a cylinder-shaped space 19 between the die external cylinder 18 and the mandrel 17, a ring-shaped piston 12 for pressing the resin blend retained in the cylinder-shaped space 19 downward, and the extrusion outlet (die outlet 11) that discharges the resin blend.

In the extruding step S1, first, the resin blend as a supercritical fluid in which the thermoplastic resin and the foaming agent are blended is kneaded in the die 10. Then, the kneaded resin blend is retained in the cylinder-shaped space 19 between the mandrel 17 and the die external cylinder 18. Here, it is preferable that an amount of the retained resin blend be 5 to 40 liters.

Subsequently, after a predetermined amount of resin blend is retained in the cylinder-shaped space 19, the ring-shaped piston 12 is pressed downward. Thus, the resin blend is extruded in a cylindrical shape between split mold blocks 13 through the die outlet 11 as illustrated in FIG. 3. The resin blend foams at the same time upon extrusion to form a cylinder-shaped foamed parison 20.

In the method for manufacturing a molded foam described above, the resin blend is retained in the cylinder-shaped space 19. Therefore, sizes of foamed cells are uniformized while the resin blend is retained.

Further, since a method in which the ring-shaped piston 12 in the die external cylinder 18 extrudes the resin blend is employed (accumulator head system or accumulator-inside-die system), it is possible to reduce a length between a top and a bottom of the die outlet 11, and thus to increase an extrusion speed. Therefore, it is possible to maintain a condition of the foamed cells.

Here, it is preferable that the speed of extruding the resin blend be not less than 700 kg/hour. In this case, it is possible to obtain a molded foam with higher surface smoothness.

Examples of the thermoplastic resin include polyolefin-based resins such as a polyethylene resin and a polypropylene resin.

Among these, it is preferable that the thermoplastic resin include a propylene unit. Specific examples include propylene homopolymer, ethylene-propylene block copolymer, ethylene-propylene random copolymer, and the like.

Further, among these, propylene homopolymer having a long chain branching structure is particularly preferable. Since using the propylene homopolymer increases a melt tension of the resin, the resin foams more easily and the foamed cells are further uniformized.

It is preferable that the propylene homopolymer having a long chain branching structure be propylene homopolymer having a weight average ramification index of not more than 0.9. Further, a weight average ramification index g' is represented by V1/V2. V1 indicates an intrinsic viscosity number of branched polyolefin, and V2 indicates an intrinsic viscosity number of linear polyolefin having the same weight average molecular weight as that of branched polyolefin.

As the thermoplastic resin, it is preferable to use a polypropylene resin having a melt tension in a range from 30 to 350 mN at 230° C. Since a polypropylene-based foaming resin shows strain hardening when the melt tension is within the above range, it is possible to obtain a high expansion ratio.

It is preferable that a melt flow rate (MFR) of the thermoplastic resin at 230° C. be 1 to 10. Here, the MFR is a value measured according to JIS K-7210.

When the MFR is less than 1, it tends to be difficult to increase the extrusion speed as compared to the case in which the MFR is within the above range. When the MFR exceeds 10, it tends to be difficult to perform blow molding due to an occurrence of drawdown and the like as compared to the case in which the MFR is within the above range.

The resin blend is preferably further added with styrene elastomer and/or low-density polyethylene. Addition of styrene elastomer or low-density polyethylene further improves an impact intensity of the molded foam at a low temperature.

Although not particularly limited, styrene elastomer is preferably elastomer having a styrene unit with hydrogenated molecules. Specific examples include hydrogenated elastomer such as styrene-ethylene/butylene-styrene block copolymer, styrene-ethylene/propylene-styrene block copolymer, and styrene-butadiene random copolymer.

It is preferable that a compounding ratio of styrene elastomer be within a range of less than 40 wt % of the thermoplastic resin in perspective of moldability.

Further, it is preferable that an amount of styrene contained in styrene elastomer be less than 30 wt % in perspective of the impact intensity at a low temperature, and more preferably, less than 20 wt %.

It is preferable that low-density polyethylene that is used has a density of not more than 0.91 g/cm$^3$ in perspective of the impact intensity at a low temperature. In particular, it is preferable to use straight-chain ultralow density polyethylene polymerized by a metallocene-based catalyst.

It is preferable that a compounding ratio of low-density polyethylene be within a range of less than 40 wt % of the thermoplastic resin in perspective of the rigidity and a heat resistance.

The resin blend described above can be added with a nucleating agent, a coloring agent or the like, in addition to styrene elastomer, low-density polyethylene, and foaming agent.

Specific examples of the foaming agent include an inorganic foaming agent such as air, a carbonic acid gas, a nitrogen gas, and water, or an organic foaming agent such as butane, pentane, hexane, dichloromethane, and dichloroethane.

Among these, it is preferable to use the air, the carbonic acid gas or the nitrogen gas as the foaming agent. Since no organic substance is added when using any of these, durability and the like do not decrease.

Further, in the foaming method, it is preferable to use the supercritical fluid. In particular, it is preferable that the resin blend be caused to foam using the carbonic acid gas or the nitrogen gas in a supercritical state. In this case, it is possible to realize uniform and reliable foaming. Here, a nitrogen supercritical fluid can be obtained by setting a critical temperature of nitrogen to be not less than −149.1° C. and its critical pressure to be not less than 3.4 MPa, and a carbon dioxide supercritical fluid can be obtained by setting a critical temperature of carbon dioxide to be not less than 31° C. and its critical pressure to be not less than 7.4 MPa.

(Attaching Step and Mold Clamping Step)

The attaching step S2 is a step in which the facing portions of the inner wall surface of the cylinder-shaped foamed parison are closely attached to each other, so that the foamed parison laminated body is formed. The mold clamping step S3 is a step in which the sealing and the mold clamping are performed to the foamed parison laminated body by clamping the foamed parison laminated body by the split mold blocks.

Figure 4A:
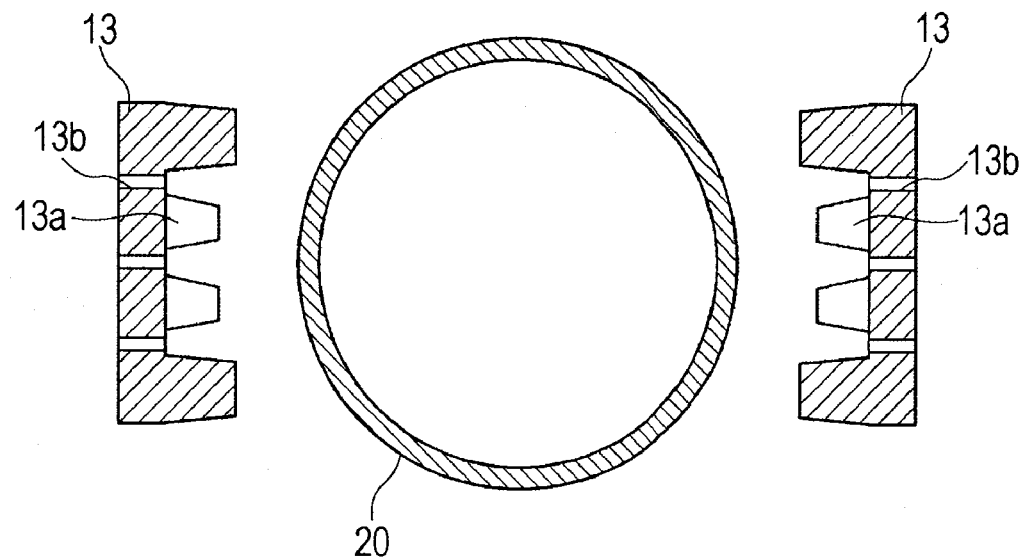
FIG. 4A is a sectional view taken along a line A-A in FIG. 3.
Figure 4B:
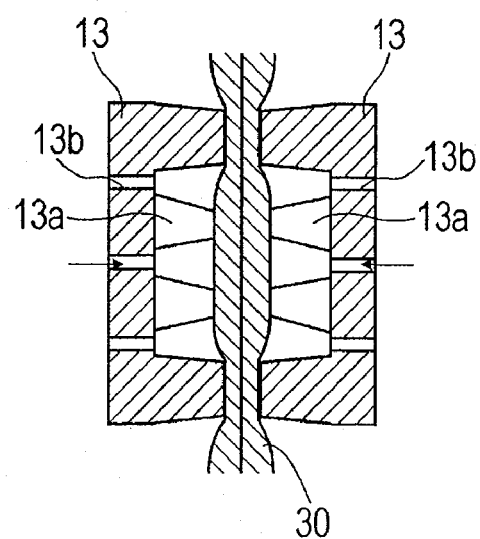
FIG. 4B is a horizontal sectional view illustrating a state after the split mold blocks are closed and an attaching step and a mold clamping step are performed to the cylinder-shaped foamed parison illustrated in FIG. 4A.

FIG. 4A is a sectional view taken along a line A-A in FIG. 3. FIG. 4B is a horizontal sectional view illustrating a state after the split mold blocks are closed and the attaching step and the mold clamping step are performed to the cylinder-shaped foamed parison illustrated in FIG. 4A.

Referring to FIG. 4A, in the method for manufacturing a molded foam according to the first embodiment, the split mold blocks 13 are provided with protuberances 13a for pressing the cylinder-shaped foamed parison 20 and closely attaching the facing portions of the inner wall surface to each other.

In the attaching step S2, by clamping the cylinder-shaped foamed parison 20 by the split mold blocks 13, the protuberances 13a provided for the split mold blocks 13 press an outer wall surface of the cylinder-shaped foamed parison 20. Thus, as illustrated in FIG. 4B, the facing portions of the inner wall surface of the cylinder-shaped foamed parison 20 are closely attached to each other, so that a foamed parison laminated body 30 is formed (attaching step S2). Specifically, an adhered area is formed without fail at a portion clamped by the protuberances 13a of the split mold blocks 13 in the foamed parison laminated body 30.

Further, at the same time as the attaching step, the cylinder-shaped foamed parison 20 (foamed parison laminated body 30) is clamped by the split mold blocks 13, and then sealed and mold-clamped (mold clamping step S3).

Thus, the foamed parison laminated body 30 is obtained.

According to the method for manufacturing a molded foam, the protuberances 13a of the split mold blocks 13 serve to form recesses in a surface of the molded foam, as well as to closely attach the facing portions of the inner wall surface of the molded foam to each other. Therefore, it is possible to manufacture the molded foam in which the recesses are formed in its surface with a simple configuration.

Further, according to this manufacturing method, it is possible to reduce a manufacturing cost since the attaching step S2 and the mold clamping step S3 are performed at the same time.

A core 15 provided at a tip end of the die 10 used in this manufacturing method is provided with a suction inlet 15a (see FIG. 3). In the attaching step, air between the facing portions of the inner wall surface of the cylinder-shaped foamed parison 20, that is, the air in the cylinder-shaped foamed parison, is sucked through the suction inlet 15a. Thus, it is possible to further improve the close attachment between the facing portions of the inner wall surface of the cylinder-shaped foamed parison 20.

Further, in the mold clamping step S3, air is blown into the split mold blocks 13 through air inlets 13b provided for the split mold blocks 13. This increases an atmospheric pressure within a sealed space between the split mold blocks 13. Consequently, the close attachment between the facing portions of the inner wall surface of the cylinder-shaped foamed parison 20 is improved even further. Specifically, laminated portions that are not clamped by the protuberances 13a are closely attached by an air pressure. Here, it is preferable that a pressure at which the air is blown be 0.05 to 0.15 Mpa in perspective of maintenance of the shape of the foamed cells, and it is preferable that a temperature of the air that is blown be higher than that of the foamed parison in perspective of prevention of cooling of the foamed parison.

According to the method for manufacturing a molded foam of the first embodiment, the foamed parison laminated body 30 is formed by performing the attaching step S2 in which the facing portions of the inner wall surface of the cylinder-shaped foamed parison 20 are closely attached to each other without fail. Thus, it is possible to suppress generation of a hollow part. Consequently, the molded foam obtained by the method for manufacturing a molded foam is reduced in weight and is excellent in strength (impact resistance and the like).

Further, according to the method for manufacturing a molded foam, the portions of the inner wall surface that are laminated in the mold clamping step S3 are not easily separated by performing the attaching step S2. Consequently, it is possible to make the entire molded foam to have a sufficient foaming state since the expansion ratio can be increased. Thus, it is possible to further reduce the weight of the molded foam.

(Sucking Step)

The sucking step S4 is a step in which the air between the split mold blocks 13 is sucked to reduce the pressure between the split mold blocks 13 in a state in which the foamed parison laminated body 30 obtained through the attaching step S2 and the mold clamping step S3 is sealed between the split mold blocks 13.

Figure 5A:
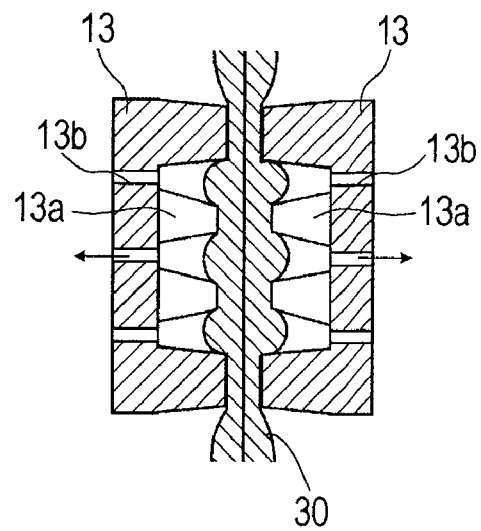
FIG. 5A is a horizontal sectional view illustrating a state before performing a sucking step to a foamed parison laminated body in the method for manufacturing a molded foam according to the first embodiment.
Figure 5B:
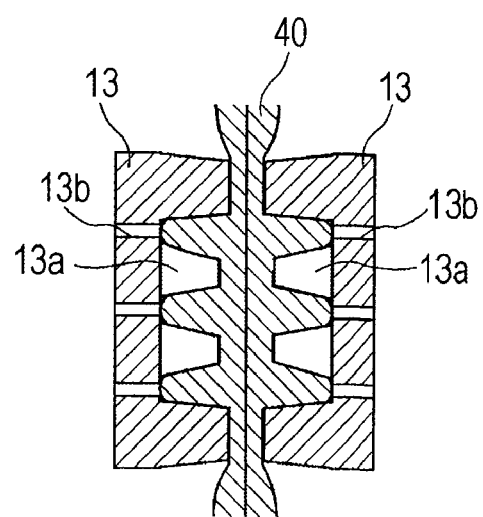
FIG. 5B is a horizontal sectional view illustrating a state after performing the sucking step to the foamed parison laminated body in the method for manufacturing a molded foam according to the first embodiment.

FIG. 5A is a horizontal sectional view illustrating a state before performing the sucking step to the foamed parison laminated body in the method for manufacturing a molded foam according to the first embodiment. FIG. 5B is a horizontal sectional view illustrating a state after performing the sucking step to the foamed parison laminated body in the method for manufacturing a molded foam according to the first embodiment.

Referring to FIG. 5A, in the sucking step S4, the air between the split mold blocks 13 is sucked through the air inlets 13b provided for the split mold blocks 13. Thus, the atmospheric pressure within the sealed space between the split mold blocks 13 decreases. Consequently, as illustrated in FIG. 5B, the foamed parison laminated body 30 is expanded toward the air inlets 13b. Since cells grow along with this, a volume of the foamed parison laminated body 30 increases. Thus, a molded foam 40 is obtained.

Figure 6A:
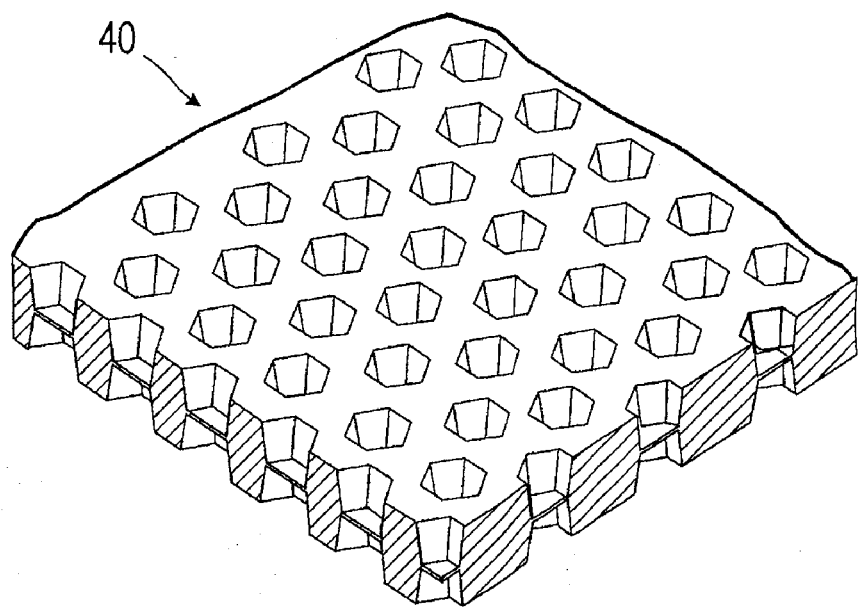
FIG. 6A is a perspective view illustrating a molded foam obtained by the method for manufacturing a molded foam according to the first embodiment.
Figure 6B:
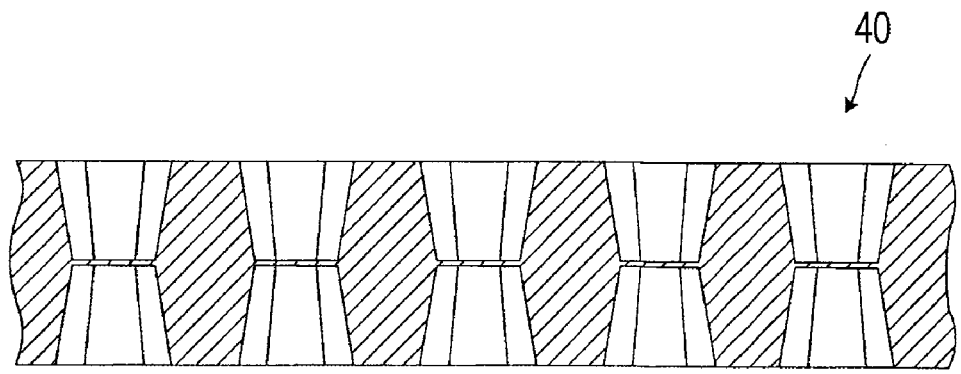
FIG. 6B is a sectional view of the molded foam.

FIG. 6A is a perspective view illustrating a molded foam obtained by the method for manufacturing a molded foam according to the first embodiment, and FIG. 6B is a sectional view of the molded foam.

As illustrated in FIG. 6A, recesses are formed in a surface of the molded foam 40, and this realizes weight reduction. Further, as illustrated in FIG. 6B, the molded foam 40 is filled with the thermoplastic resin, so that no hollow part is formed. Consequently, the molded foam 40 is lightweight and excellent in strength.

The molded foam 40 has a closed cell structure including a plurality of foamed cells. Here, the closed cell structure refers to a structure including a plurality of foamed cells where a proportion of closed cells is not less than 50%. Consequently, excellent surface smoothness can be provided.

It is preferable that an average cell diameter of the foamed cells be less than 1000 μm, and more preferably, less than 500 μm. Here, the average cell diameter refers to an average value of maximum diameters of the numerous cells.

When the average cell diameter is not less than 1000 μm, the surface smoothness tends to deteriorate since the surface becomes rougher as compared to the case in which the average cell diameter is within the above range.

The molded foam 40 is a high-foaming molded body with an expansion ratio from 3.0 to 20 times. Here, the expansion ratio is a value obtained by dividing a density of the thermoplastic resin by an apparent density of the molded foam.

The molded foam 40 is suitably used as foam core materials. Specifically, the molded foam 40 is used for such as structural members having a high flexure strength or resistant to flexural buckling for automobiles, aircrafts, vehicles and ships, architectural materials, electrical appliance housings, sports and leisure products, and the like.

In particular, it is possible to reduce the weight of an automobile by using the molded foam 40 as automotive structural members for cargo floor boards, deck boards, rear parcel shelves, roof panels, interior panels such as door trims, door inner panels, platforms, hardtops, sun roofs, hoods, bumpers, floor spacers, and tibia pads, so that fuel efficiency can be improved.

Second Embodiment

The following describes a second embodiment of the method for manufacturing a molded foam according to the present invention.

FIG. 7 is a flowchart of the method for manufacturing a molded foam according to the second embodiment.

Referring to FIG. 7, the method for manufacturing a molded foam according to the second embodiment includes the extruding step S1, a deforming step S5, the attaching step S2, the mold clamping step S3, and the sucking step S4. In the extruding step S1, the cylinder-shaped foamed parison in the cylinder shape is formed by extruding the resin blend containing the foaming agent and the thermoplastic resin. In the deforming step S5, the cylinder-shaped foamed parison is deformed into a flat shape. In the attaching step S2, the facing portions of the inner wall surface of the cylinder-shaped foamed parison are closely attached to each other, so that the foamed parison laminated body is formed. In the mold clamping step S3, the sealing and the mold clamping are performed to the foamed parison laminated body by clamping the foamed parison laminated body by the split mold blocks. In the sucking step S4, the air between the split mold blocks to reduce the pressure between the split mold blocks. Specifically, the method for manufacturing a molded foam according to the second embodiment is the same as the method for manufacturing a molded foam according to the first embodiment, other than that the deforming step S5 is further provided.

According to the method for manufacturing a molded foam of the second embodiment, the extruding step S1, the deforming step S5, the attaching step S2 and the mold clamping step S3 (simultaneous), and the sucking step S4 are performed in the stated order.

(Deforming Step)

The deforming step S5 is a step performed between the extruding step S1 and the attaching step S2, and in which the cylinder-shaped foamed parison is deformed into the flat shape using a pair of rod-shaped members.

Figure 8A:
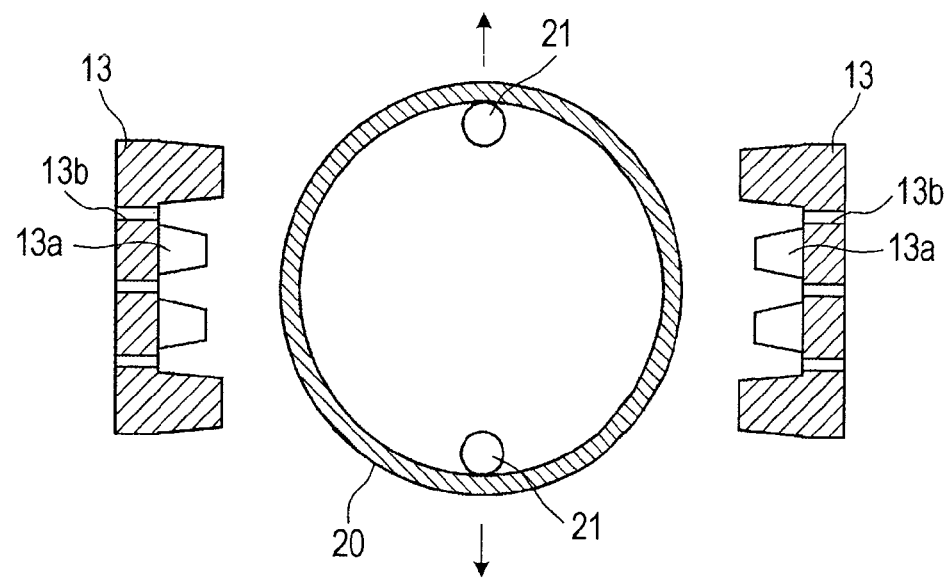
FIG. 8A is a horizontal sectional view illustrating a state before performing a deforming step to the cylinder-shaped foamed parison in the method for manufacturing a molded foam according to the second embodiment.
Figure 8B:
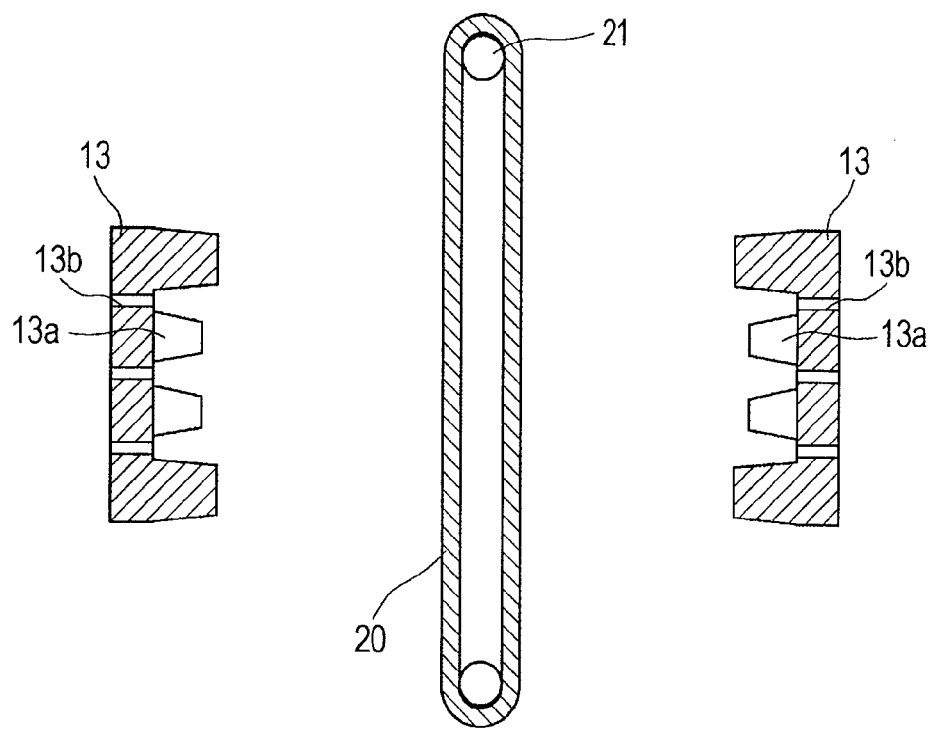
FIG. 8B is a horizontal sectional view illustrating a state after performing the deforming step to the cylinder-shaped foamed parison in the method for manufacturing a molded foam according to the second embodiment.

FIG. 8A is a horizontal sectional view illustrating a state before performing the deforming step to the cylinder-shaped foamed parison in the method for manufacturing a molded foam according to the second embodiment. FIG. 8B is a horizontal sectional view illustrating a state after performing the deforming step to the cylinder-shaped foamed parison in the method for manufacturing a molded foam according to the second embodiment.

Referring to FIG. 8A, in the deforming step S5, a pair of rod-shaped members 21 are inserted into the cylinder-shaped foamed parison 20 and moved respectively in directions opposite to each other. Thus, as illustrated in FIG. 8B, the cylinder-shaped parison 20 is expanded in a diameter direction and deformed into the flat shape.

According to the method for manufacturing a molded foam of the second embodiment, providing the deforming step S5 makes it easier for the facing portions of the inner wall surface of the cylinder-shaped foamed parison 20 to be closely attached to each other in the attaching step S2.

Further, when the attaching step S2 and the mold clamping step S3 are performed at the same time, it is possible to decrease a time period from the outer wall surface of the cylinder-shaped foamed parison 20 and the split mold blocks 13 are first brought into contact with each other until the outer wall surface of the cylinder-shaped foamed parison 20 and the split mold blocks 13 are fully brought into contact with each other.

Therefore, according to the method for manufacturing a molded foam, it is possible to prevent the molded foam from being partially thin, and thus it is possible to suppress the generation of the hollow part.

Third Embodiment

The following describes a third embodiment of the method for manufacturing a molded foam according to the present invention.

The method for manufacturing a molded foam according to the third embodiment is the same as the method for manufacturing a molded foam according to the second embodiment, other than that the deforming step is different from that in the method for manufacturing a molded foam according to the second embodiment.

(Deforming Step)

The deforming step is a step performed between the extruding step S1 and the attaching step S2, and in which the cylinder-shaped foamed parison is deformed into the flat shape using a pair of guiding members.

Figure 9A:
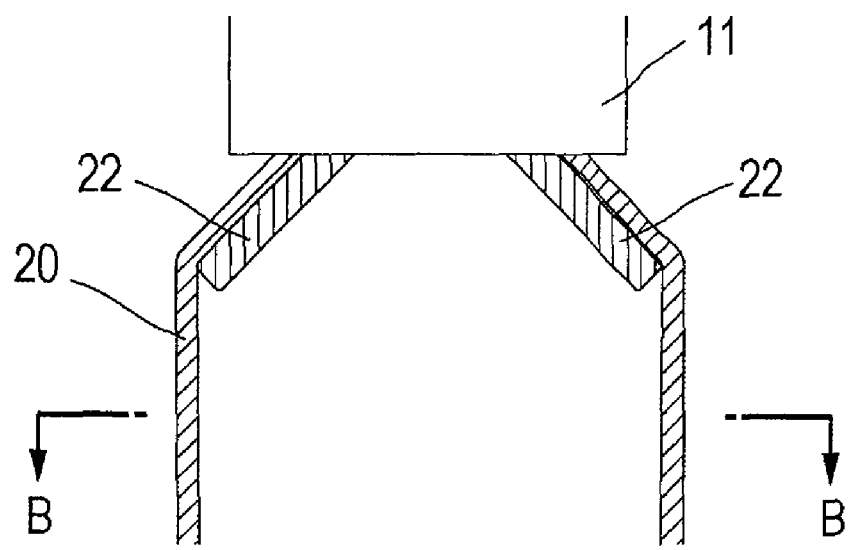
FIG. 9A is a vertical sectional view illustrating a deforming step in a method for manufacturing a molded foam according to a third embodiment.
Figure 9B:
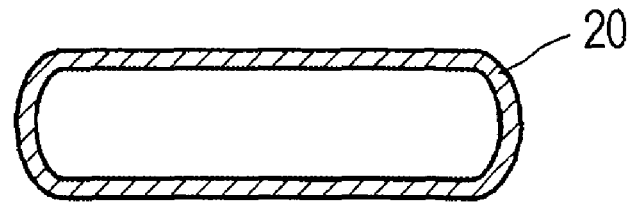
FIG. 9B is a sectional view taken along a line B-B in FIG. 9A.

FIG. 9A is a vertical sectional view illustrating the deforming step in the method for manufacturing a molded foam according to the third embodiment, and FIG. 9B is a sectional view taken along a line B-B in FIG. 9A.

Referring to FIG. 9A, in the deforming step, a pair of guiding members 22 that are provided below the extrusion outlet guide the extruded cylinder-shaped foamed parison 20 from inside of the cylinder-shaped foamed parison 20. Thus, as illustrated in FIG. 9B, the cylinder-shaped parison 20 is deformed into the flat shape. The guiding members 22 are provided so as to be wider toward the bottom. Consequently, the cylinder-shaped foamed parison 20 expands along the guiding members 22.

According to the method for manufacturing a molded foam of the third embodiment, providing the deforming step makes it easier for the facing portions of the inner wall surface of the cylinder-shaped foamed parison 20 to be closely attached to each other in the attaching step S2.

Fourth Embodiment

The following describes a fourth embodiment of the method for manufacturing a molded foam according to the present invention.

The method for manufacturing a molded foam according to the fourth embodiment is the same as the method for manufacturing a molded foam according to the second embodiment and the method for manufacturing a molded foam according to the third embodiment, other than that the deforming step is different from that in the method for manufacturing a molded foam according to the second embodiment and the method for manufacturing a molded foam according to the third embodiment.

(Deforming Step)

The deforming step is a step performed between the extruding step S1 and the attaching step S2, and in which the cylinder-shaped foamed parison is deformed into the flat shape using a pair of rollers.

Figure 10A:
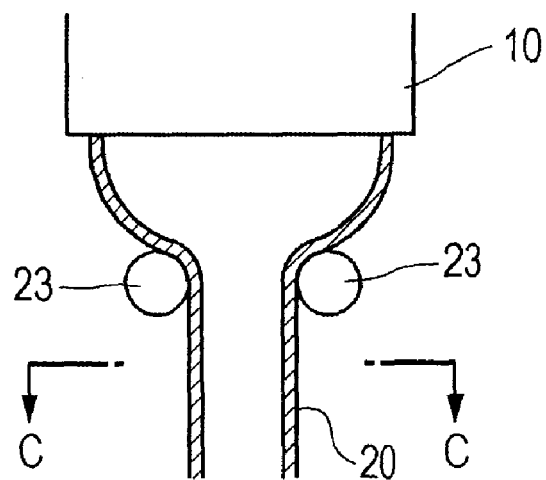
FIG. 10A is a vertical sectional view illustrating a deforming step in a method for manufacturing a molded foam according to a fourth embodiment.
Figure 10B:
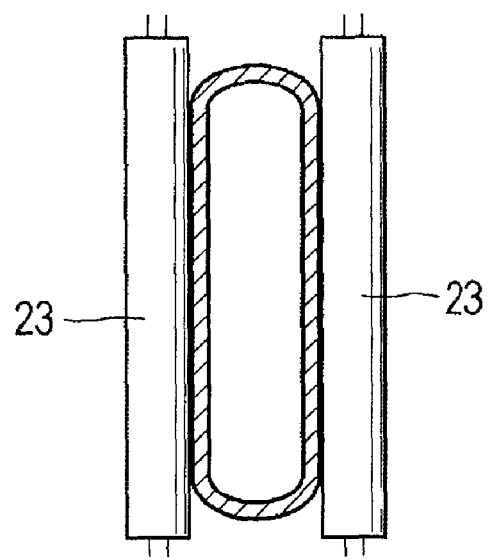
FIG. 10B is a sectional view taken along a line C-C in FIG. 10A.

FIG. 10A is a vertical sectional view illustrating the deforming step in the method for manufacturing a molded foam according to the fourth embodiment, and FIG. 10B is a sectional view taken along a line C-C in FIG. 10A.

As illustrated in FIGS. 10A and 10B, in the deforming step, the extruded cylinder-shaped foamed parison 20 is deformed into the flat shape by a pair of rollers 23 provided under the extrusion outlet.

According to the method for manufacturing a molded foam of the fourth embodiment, providing the deforming step makes it easier for the facing portions of the inner wall surface of the cylinder-shaped foamed parison 20 to be closely attached to each other in the attaching step S2.

Fifth Embodiment

The following describes a fifth embodiment of the method for manufacturing a molded foam according to the present invention.

Figure 11:
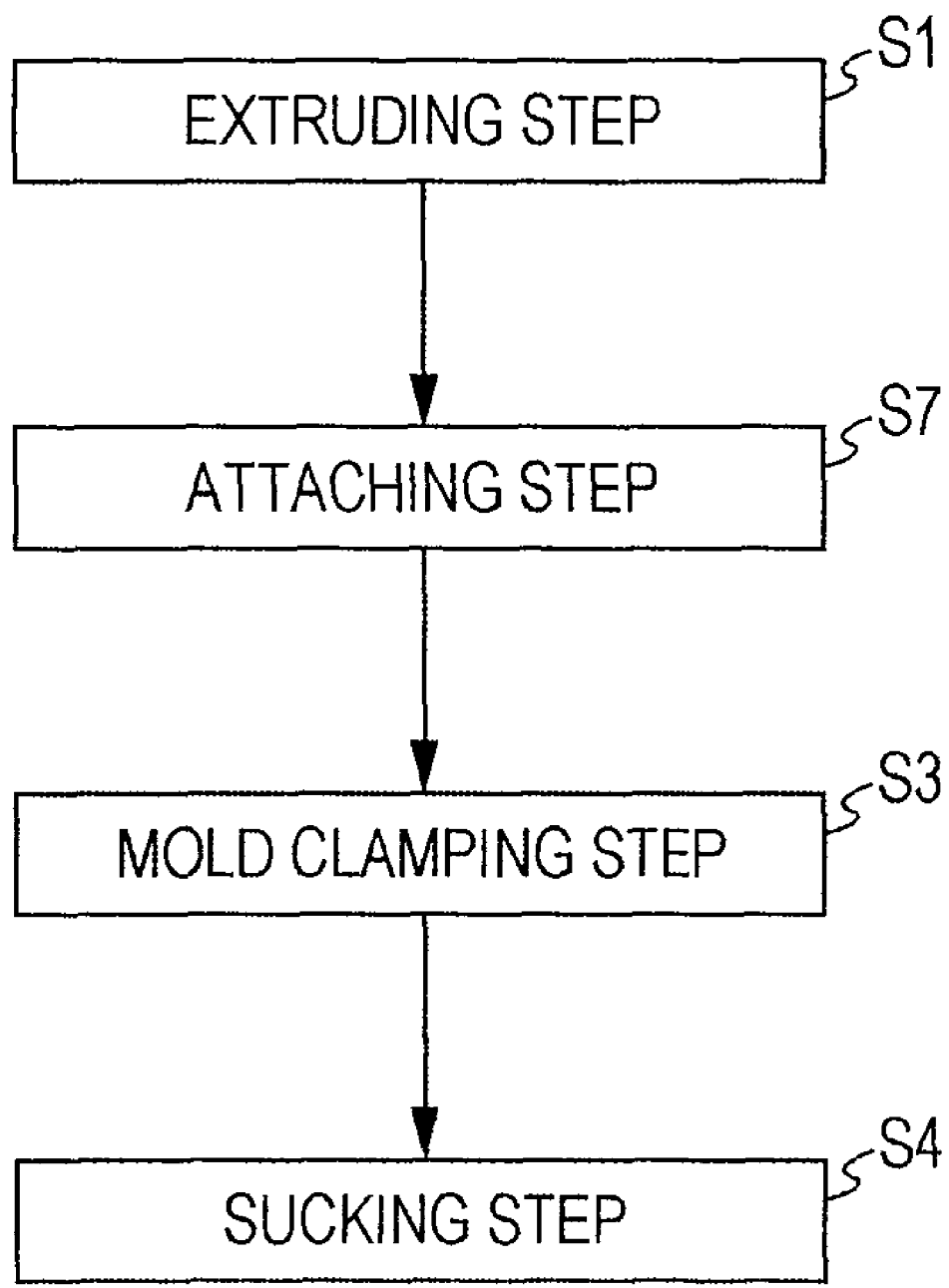
FIG. 11 is a flowchart of a method for manufacturing a molded foam according to a fifth embodiment.

FIG. 11 is a flowchart of the method for manufacturing a molded foam according to the fifth embodiment.

As illustrated in FIG. 11, the method for manufacturing a molded foam according to the fifth embodiment is the same as the method for manufacturing a molded foam according to the first embodiment, other than that the attaching step and the mold clamping step are provided as independent steps and the attaching step is performed before the mold clamping step. Specifically, the extruding step S1, an attaching step S7, the mold clamping step S3, and the sucking step S4 are performed in the stated order.

(Attaching Step)

The attaching step S7 is a step in which the facing portions of the inner wall surface of the cylinder-shaped foamed parison are sandwiched and closely attached to each other by rollers, so that the foamed parison laminated body is formed.

Figure 12:
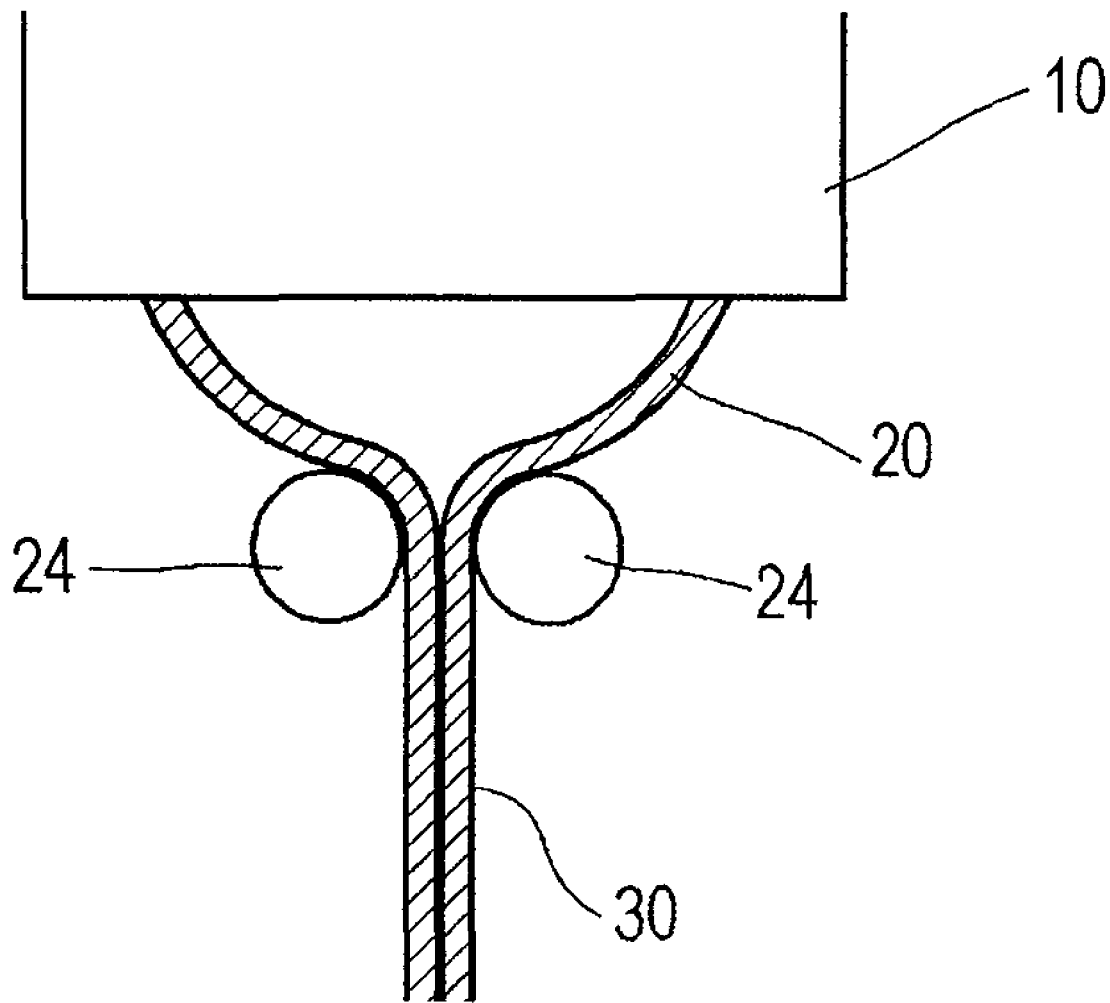
FIG. 12 is a vertical sectional view illustrating an attaching step in the method for manufacturing a molded foam according to the fifth embodiment.

FIG. 12 is a vertical sectional view illustrating the attaching step in the method for manufacturing a molded foam according to the fifth embodiment.

As illustrated in FIG. 12, in the attaching step S7, the facing portions of the inner wall surface of the cylinder-shaped foamed parison 20 are sandwiched and closely attached to each other by a pair of rollers 24 immediately after the cylinder-shaped foamed parison 20 is extruded. Thus, the foamed parison laminated body 30 is formed. In this case, it is possible to facilitate the close attachment between the facing portions of the inner wall surface of the cylinder-shaped foamed parison 20 over a wide area.

(Mold Clamping Step)

The mold clamping step S3 is performed to the foamed parison laminated body obtained in the attaching step S7 in the same manner as the mold clamping step S3 in the method for manufacturing a molded foam according to the first embodiment. The mold clamping step S3 in the method for manufacturing a molded foam according to the fifth embodiment is performed after the attaching step S7 is performed and the foamed parison laminated body is formed. Consequently, the split mold blocks are not necessarily provided with the protuberances. Further, if the split mold blocks are provided with the protuberances, the protuberances further press against the outer wall surface of the foamed parison laminated body. As a result, the close attachment is further improved.

Sixth Embodiment

The following describes a sixth embodiment of the method for manufacturing a molded foam according to the present invention.

Figure 13:
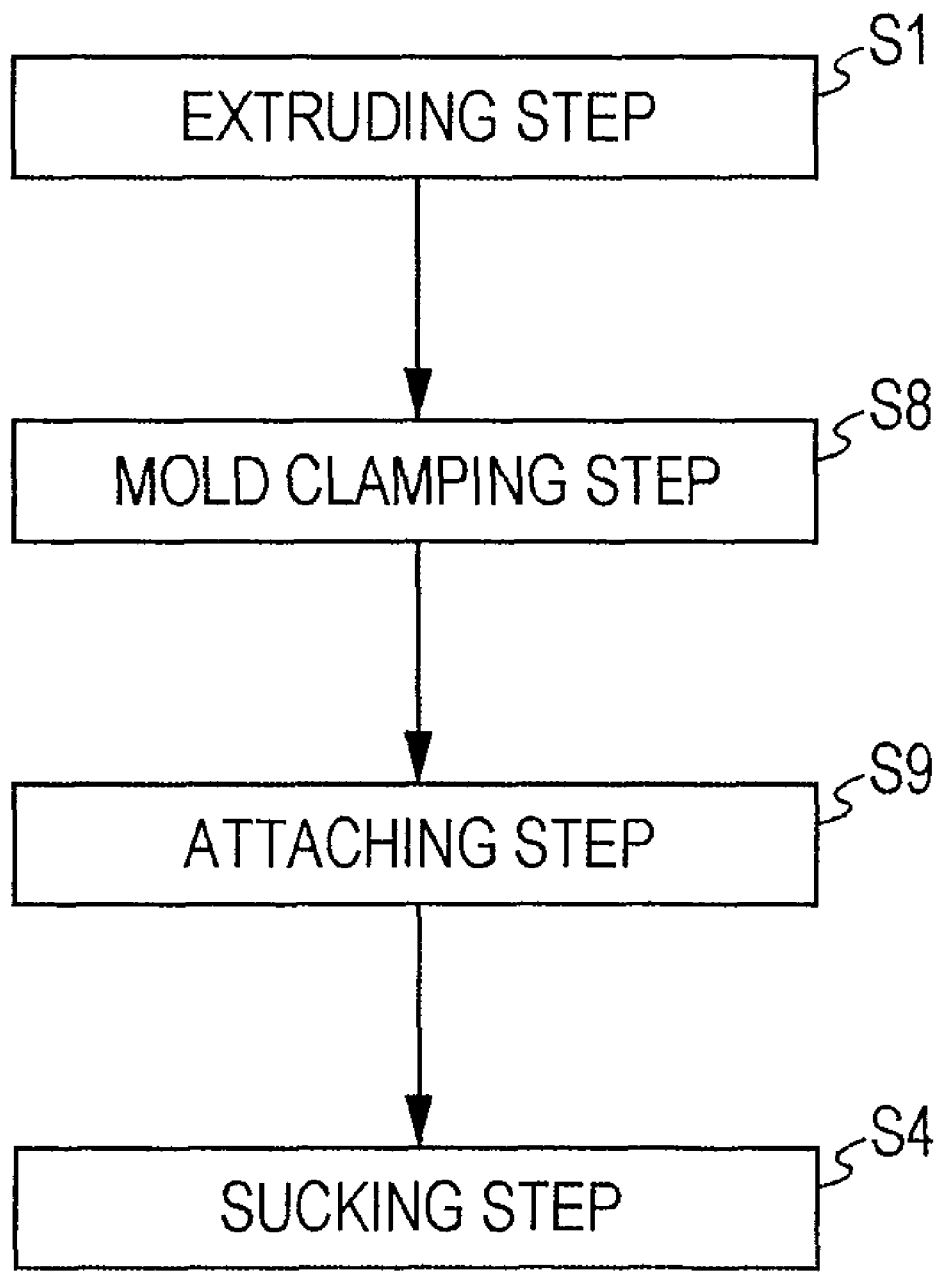
FIG. 13 is a flowchart of a method for manufacturing a molded foam according to a sixth embodiment.

FIG. 13 is a flowchart of the method for manufacturing a molded foam according to the sixth embodiment.

As illustrated in FIG. 13, the method for manufacturing a molded foam according to the sixth embodiment is the same as the method for manufacturing a molded foam according to the first embodiment, other than that the attaching step and the mold clamping step are provided as independent steps and the mold clamping step is performed before the attaching step.

In other words, the method for manufacturing a molded foam according to the sixth embodiment includes the extruding step S1, a mold clamping step S8, an attaching step S9, and the sucking step S4. In the extruding step S1, the cylinder-shaped foamed parison in the cylinder shape is formed by extruding the resin blend containing the foaming agent and the thermoplastic resin. In the mold clamping step S8, the sealing and the mold clamping are performed to the cylinder-shaped foamed parison by clamping the foamed parison laminated body by the split mold blocks. In the attaching step S9, the facing portions of the inner wall surface of the cylinder-shaped foamed parison are closely attached to each other, so that the foamed parison laminated body is formed. In the sucking step S4, the air between the split mold blocks is sucked to reduce the pressure between the split mold blocks. The extruding step S1, the mold clamping step S8, the attaching step S9, and the sucking step S4 are performed in the stated order.

Figure 14A:
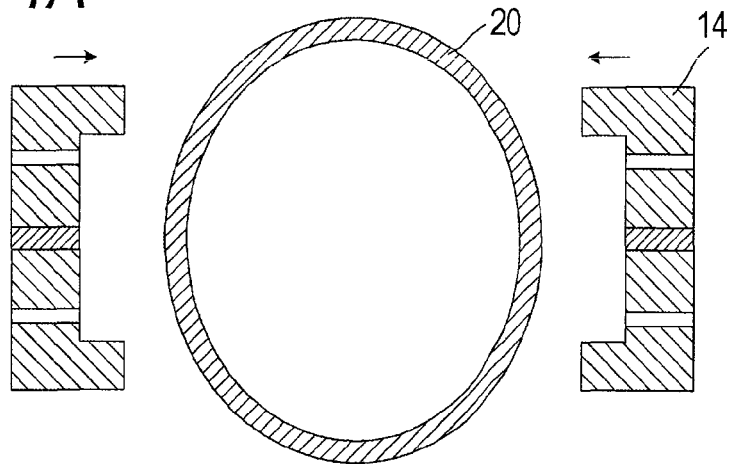
FIGS. 14A, 14B and 14C are horizontal sectional views each illustrating a mold clamping step and an attaching step in the method for manufacturing a molded foam according to the sixth embodiment.
Figure 14B:
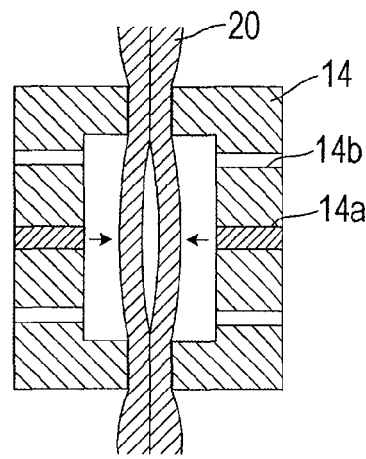
Figure 14C:
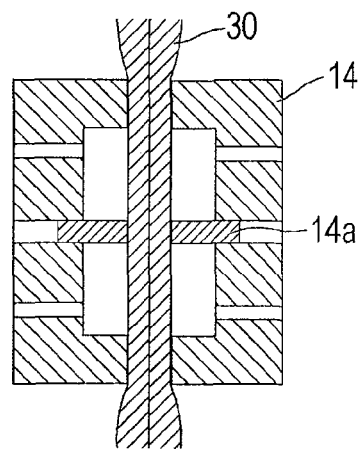

FIGS. 14A, 14B and 14C are horizontal sectional views each illustrating the mold clamping step and the attaching step in the method for manufacturing a molded foam according to the sixth embodiment.

(Mold Clamping Step)

The mold clamping step S8 is the same as the mold clamping step S3 in the method for manufacturing a molded foam according to the first embodiment, other than that the split mold blocks 14 that are used include no protuberances.

As illustrated in FIG. 14A, in the mold clamping step S8, the cylinder-shaped foamed parison 20 is clamped by the split mold blocks 14 on the both sides and sealed. Thus, the cylinder-shaped foamed parison 20 is mold-clamped as illustrated in FIG. 14B.

(Attaching Step)

The attaching step S9 is a step in which the facing portions of the inner wall surface of the cylinder-shaped foamed parison 20 are closely attached to each other, so that the foamed parison laminated body is formed.

As illustrated in FIG. 14B, in the attaching step S9, the split mold blocks 14 are respectively provided with slidable slide cores 14a.

Then, as illustrated in FIG. 14B, the slide cores 14a are caused to slide in a state in which the cylinder-shaped foamed parison 20 is mold-clamped. Thus, the outer wall surface of the cylinder-shaped foamed parison 20 is pressed, and the facing portions of the inner wall surface of the cylinder-shaped foamed parison 20 are closely attached to each other. Thus, the foamed parison laminated body 30 is formed as illustrated in FIG. 14C.

The method for manufacturing a molded foam according to the sixth embodiment provides an advantageously effect that a width direction in which the cylinder-shaped foamed parison 20 is clamped can be freely adjusted by adjusting a sliding condition of the slide cores 14a.

Further, it is possible to manufacture the molded foam having no recess by drawing the slide cores 14a to the surfaces of the split mold blocks 14. Specifically, it is possible to adjust a depth of a recess formed in the molded foam by adjusting an amount of drawing of the slide cores 14a.

While the preferred embodiments according to the present invention have been described above, the present invention is not particularly limited to these embodiments.

For example, according to the method for manufacturing a molded foam of the first to the sixth embodiments, the cylinder-shaped foamed parison is used to manufacture the molded foam. However, in a method for manufacturing a molded foam according to a different embodiment, a plurality of (e.g., two) sheet-shaped foamed parisons can be used.

In this case, the method for manufacturing a molded foam includes the extruding step of forming sheet-shaped foamed parisons in a sheet shape by extruding the resin blend containing the foaming agent and the thermoplastic resin, the attaching step of forming the foamed parison laminated body by closely attaching facing inner wall surfaces of the plurality of sheet-shaped foamed parisons, the mold clamping step of sealing and mold clamping the foamed parison laminated body by clamping by the split mold blocks, and the sucking step of sucking the air between the split mold blocks to reduce the pressure between the split mold blocks. In this case, sucking in the deforming step and the attaching step is not performed.

Figure 15:
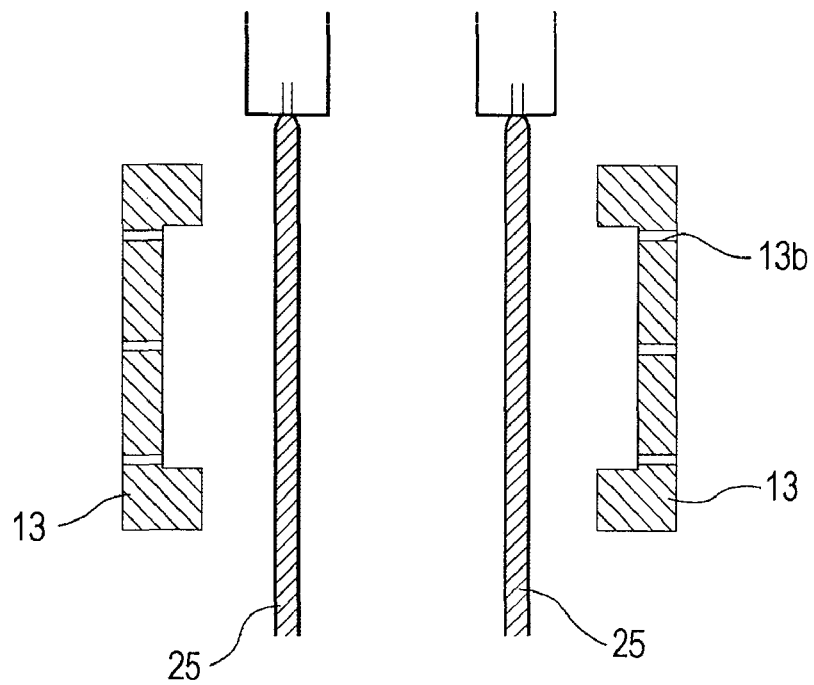
FIG. 15 is a vertical sectional view illustrating a state in which sheet-shaped foamed parisons are extruded between the split mold blocks in a method for manufacturing a molded foam according to a different embodiment.

FIG. 15 is a vertical sectional view illustrating a state in which the sheet-shaped foamed parisons are extruded between the split mold blocks in the method for manufacturing a molded foam according to the different embodiment.

As illustrated in FIG. 15, in the extruding step, two sheet-shaped foamed parisons 25 are extruded through the extrusion outlet (e.g., a T die) so as to be parallel to each other.

Then, the state as illustrated in FIG. 4B is realized by closing the split mold blocks 13 from outside of the sheet-shaped foamed parisons 25. A number of the sheet-shaped foamed parisons can be more than two.

Further, it is not necessary to transfer and mold the extruded foamed parisons directly between the split mold blocks. It is possible to provide the foamed parison molded body after the foamed parisons are cooled and solidified after the extrusion, and then, re-heat the foamed parison molded body to unsolidify into the foamed parisons, and to transfer and mold the foamed parisons between the split mold blocks.

While, according to the method for manufacturing a molded foam according to the first embodiment, the air between the facing portions of the inner wall surface of the foamed parison is sucked in the attaching step, this sucking may not be performed.

Further, while the air is blown between the split mold blocks through the air inlets provided for the split mold blocks in the mold clamping step, this blowing may not be performed as well.

Seventh Embodiment

The following describes a seventh embodiment of the method for manufacturing a molded foam according to the present invention, taking an example in which a cylinder-shaped foamed parison is used.

Figure 16:
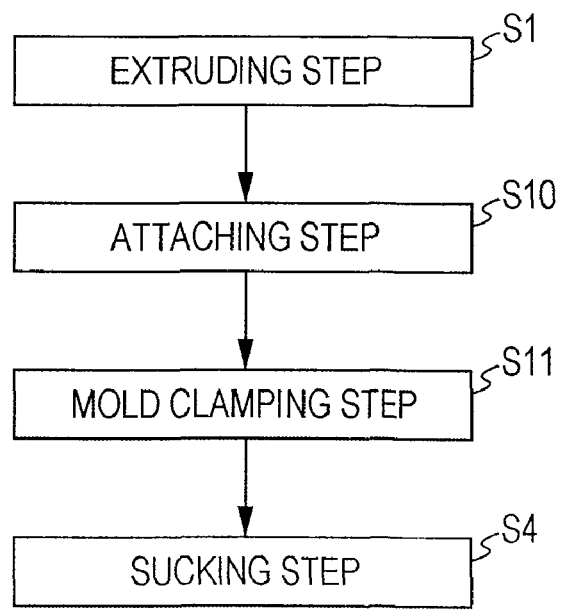
FIG. 16 is a flowchart of a method for manufacturing a molded foam according to a seventh embodiment.

FIG. 16 is a flowchart of the method for manufacturing a molded foam according to the seventh embodiment.

Referring to FIG. 16, the method for manufacturing a molded foam according to the seventh embodiment includes the extruding step S1, an attaching step S10, a mold clamping step S11, and the sucking step S4. In the extruding step S1, the cylinder-shaped foamed parison in the cylinder shape is formed by extruding the resin blend containing the foaming agent and the thermoplastic resin. In the attaching step S10, the facing portions of the inner wall surface of the cylinder-shaped foamed parison are closely attached to each other, so that the foamed parison laminated body is formed. In the mold clamping step S11, the sealing and the mold clamping are performed to the foamed parison laminated body by transferring and clamping the foamed parison laminated body by the split mold blocks. In the sucking step S4, the air between the split moldblocks is sucked to reduce the pressure between the split mold blocks. Specifically, the extruding step S1, the attaching step S10, the mold clamping step S11, and the sucking step S4 are performed in the stated order.

According to the method for manufacturing a molded foam described above, it is possible to manufacture a molded foam which is reduced in weight and is excellent in strength (including no hollow part).

In the following, each of the steps will be described in further detail.

(Extruding Step)

The extruding step S1 and the material of the cylinder-shaped foamed parison are the same as those described in the first embodiment, and are not described here.

(Attaching Step)

The attaching step S10 is a step in which the cylinder-shaped foamed parison extruded in the extruding step S1 is sandwiched between a pair of pressure-attachment rollers to closely attach the facing portions of the inner wall surface of the cylinder-shaped foamed parison to each other, so that the foamed parison laminated body is formed.

Figure 17:
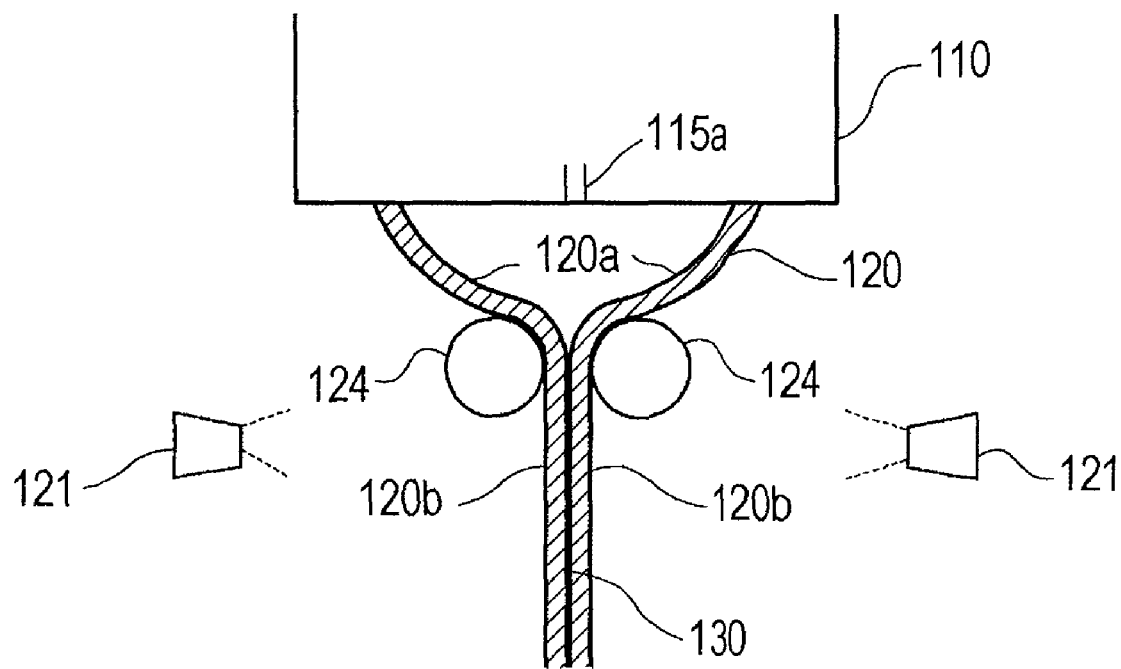
FIG. 17 is a vertical sectional view illustrating an attaching step in the method for manufacturing a molded foam according to the seventh embodiment.

FIG. 17 is a vertical sectional view illustrating the attaching step in the method for manufacturing a molded foam according to the seventh embodiment.

As illustrated in FIG. 17, in the attaching step S10, a cylinder-shaped foamed parison 120 is sandwiched by a pair of pressure-attachment rollers 124 immediately after the cylinder-shaped foamed parison 120 is extruded. Thus, a foamed parison laminated body 130 is formed by closely attaching facing portions of an inner wall surface 120a of the cylinder-shaped foamed parison 120 to each other. Consequently, it is possible to closely attach the facing portions of the inner wall surface 120a of the cylinder-shaped foamed parison 120 to each other continuously over a wide area. Consequently, it is possible to make a thickness of the foamed parison laminated body 130 even. In addition, as this is realized by only using the pair of pressure-attachment rollers, a device can be simplified.

Here, it is preferable that a pressure of sandwiching of the pressure-attachment rollers 124 be not more than 1 kg/cm$^2$. In this case, the moldability is improved since cells that are formed due to the foaming are not easily broken even when the cylinder-shaped foamed parison 120 is sandwiched by the pressure-attachment rollers 124.

According to the method for manufacturing a molded foam of the seventh embodiment, the suction inlet 115a is provided for a core at a tip end of a die 110. In the attaching step S10, the air between the facing portions of the inner wall surface 120a of the cylinder-shaped foamed parison 120, that is, the air in the cylinder-shaped foamed parison 120 is sucked through the suction inlet 115a. Thus, it is possible to suppress the generation of the hollow part, which can result in reduction of the strength, without breaking the cells. Moreover, it is possible to further improve the close attachment between the facing portions of the inner wall surface 120a of the cylinder-shaped foamed parison 120.

In the attaching step S10, there is provided air inlets 121 through which air is blown to an outer wall surface 120b of the foamed parison laminated body 130 formed by closely attaching the facing portions of the inner wall surface 120a of the cylinder-shaped foamed parison 120 to each other.

By blowing the air through the air inlets 121 to the outer wall surface 120b of the foamed parison laminated body 130, it is possible to more reliably improve the close attachment of the foamed parison laminated body 130. Further, since only the air is brought into contact with the foamed parison laminated body 130, it is possible to suppress the generation of the hollow part without breaking the cells. Furthermore, it is possible to prevent the cylinder-shaped foamed parison 120 from being caught between the pressure-attachment rollers 124 before being closely attached.

It is preferable that a temperature of the air blown through the air inlets 121 be higher than that of the foamed parison laminated body 130. In this case, it is possible to suppress a phenomenon that the foamed parison is cooled and hardened, and therefore the moldability is improved.

According to the method for manufacturing a molded foam of the seventh embodiment, the foamed parison laminated body 130 is formed by closely attaching the facing portions of the inner wall surface 120a of the cylinder-shaped foamed parison 120 to each other reliably. Thus, it is possible to suppress the generation of the hollow part. Consequently, the molded foam obtained by the method for manufacturing a molded foam is reduced in weight and is excellent in strength (impact resistance and the like).

Further, the portions of the inner wall surface 120a that are closely attached to each other in the attaching step S10 are not easily separated by performing the mold clamping step S11 that will be later described. As a result, it is possible to make the entire molded foam to have a sufficient foaming state as the expansion ratio can be increased. Thus, it is possible to further reduce the weight of the molded foam.

(Mold Clamping Step)

The mold clamping step S11 is a step in which the sealing and the mold clamping are performed by transferring and clamping the foamed parison laminated body 130 obtained in the attaching step S10 between the split mold blocks 113.

Figure 18A:
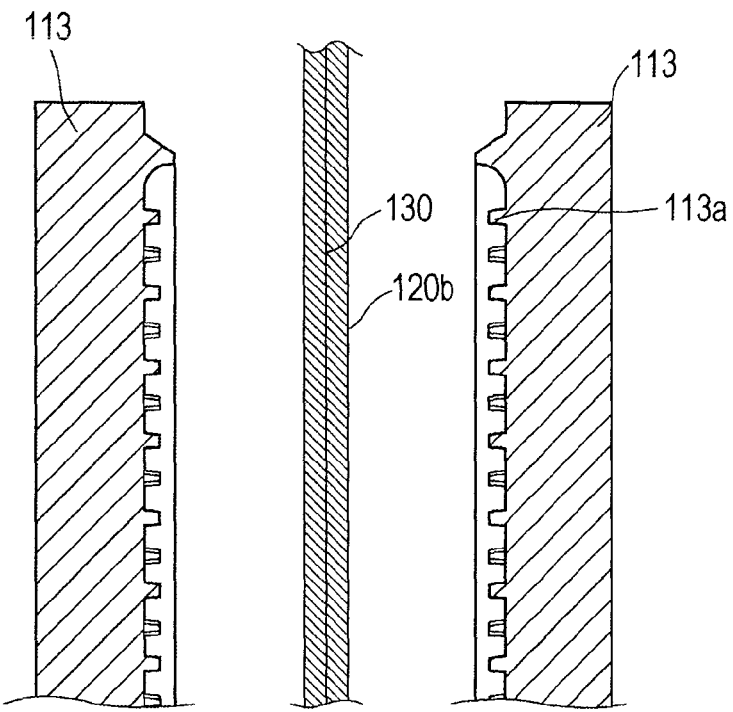
FIG. 18A is a vertical sectional view illustrating a state in which the foamed parison laminated body is transferred between the split mold blocks in a mold clamping step in the method for manufacturing a molded foam according to the seventh embodiment.
Figure 18B:
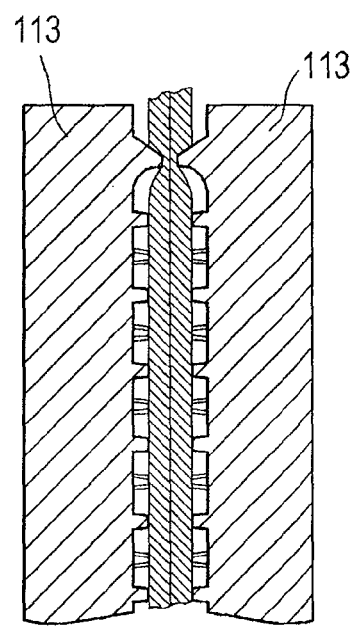
FIG. 18B is a vertical sectional view illustrating a state in which sealing and mold clamping are performed to the foamed parison laminated body illustrated in FIG. 18A by clamping the foamed parison laminated body by the split mold blocks.

FIG. 18A is a vertical sectional view illustrating a state in which the foamed parison laminated body is transferred between the split mold blocks in the mold clamping step in the method for manufacturing a molded foam according to the seventh embodiment. FIG. 18B is a vertical sectional view illustrating a state in which the sealing and the mold clamping are performed to the foamed parison laminated body illustrated in FIG. 18A by clamping the foamed parison laminated body by the split mold blocks.

As illustrated in FIG. 18A, in the mold clamping step S11, first, the foamed parison laminated body 130 is transferred between the split mold blocks 113.

Here, the split mold blocks 113 constitute a pair of molds that are openable and closable. Each of the split mold blocks 113 is provided with a plurality of protuberances 113a for maintaining a constant distance between the split mold blocks, and a plurality of air inlets (not illustrated) that will be later described.

Then, as illustrated in FIG. 18B, the sealing and the mold clamping are performed to the foamed parison laminated body 130 by clamping the foamed parison laminated body 130 by the split mold blocks 113.

When performing the mold clamping, an irregular pattern is left on the foamed parison laminated body 130 since the protuberances 113a are provided for the split mold blocks 113. Moreover, it is possible to further improve the close attachment between the facing portions of the inner wall surface 120a by the protuberances 113a pressing against the outer wall surface 120b of the foamed parison laminated body 130. Furthermore, adhered areas are formed more reliably at portions clamped by the protuberances 113a of the split mold blocks 113 in the foamed parison laminated body 130.

(Sucking Step)

The sucking step S4 is a step in which the air between the split mold blocks 113 is sucked to reduce the pressure between the split mold blocks in a state in which the foamed parison laminated body 130 to which the mold clamping step S11 is performed is sealed between the split mold blocks 113. The sucking step S4 is the same as that described in the first embodiment, and is not described here.

The molded foam obtained through the sucking step S4 has a closed cell structure including a plurality of foamed cells. Here, the closed cell structure refers to a structure including a plurality of foamed cells where a proportion of closed cells is not less than 50%. Consequently, excellent surface smoothness can be provided.

Further, this molded foam is a highly-foamed molded body with an expansion ratio from 3.0 to 20 times.

Further, the molded foam is suitably used as foam core materials. Specifically, the molded foam is used for a structural member having a high flexure strength or resistant to flexural buckling for automobiles, aircrafts, vehicles and ships, architectural materials, electrical appliance housings, sports and leisure products, and the like.

In particular, it is possible to reduce the weight of an automobile by using the molded foam as automotive structural members for cargo floor boards, deck boards, rear parcel shelves, roof panels, interior panels such as door trims, door inner panels, platforms, hardtops, sun roofs, hoods, bumpers, floor spacers, and tibia pads, so that fuel efficiency can be improved.

Eighth Embodiment

The following describes an eighth embodiment of the method for manufacturing a molded foam according to the present invention.

The method for manufacturing a molded foam according to the eighth embodiment is the same as the method for manufacturing a molded foam according to the seventh embodiment, other than that the attaching step is different from that in the method for manufacturing a molded foam according to the seventh embodiment.

(Attaching Step)

The attaching step is a step in which the facing portions of the inner wall surface of the cylinder-shaped foamed parison are partially closely attached to each other by pinching the cylinder-shaped foamed parison extruded in the extruding step S1 by a pair of prepinches, so that the foamed parison laminated body is formed.

Figure 19A:
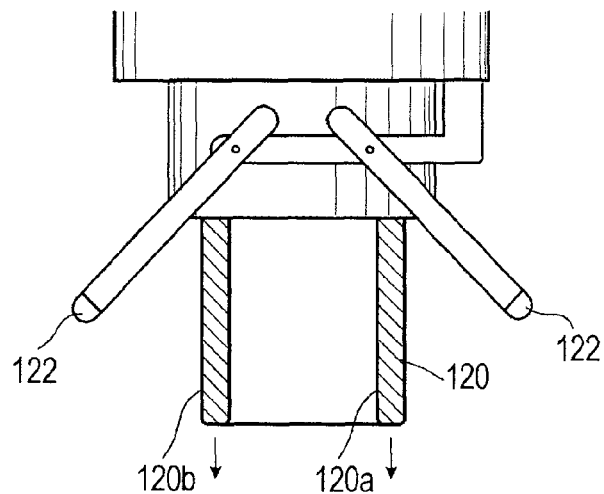
FIGS. 19A, 19B and 19C are schematic views each illustrating an attaching step in a method for manufacturing a molded foam according to an eighth embodiment.
Figure 19B:
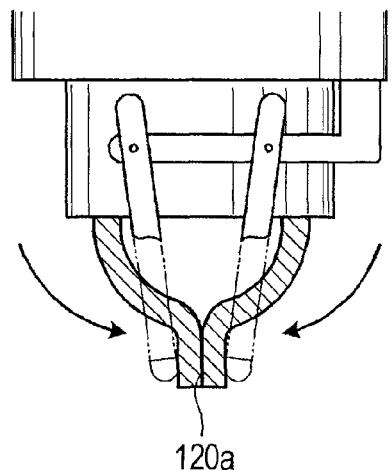
Figure 19C:
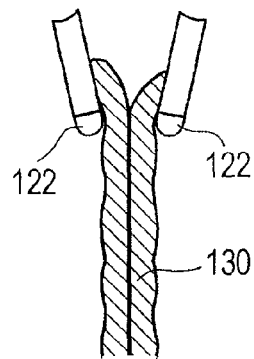
Figure 20:
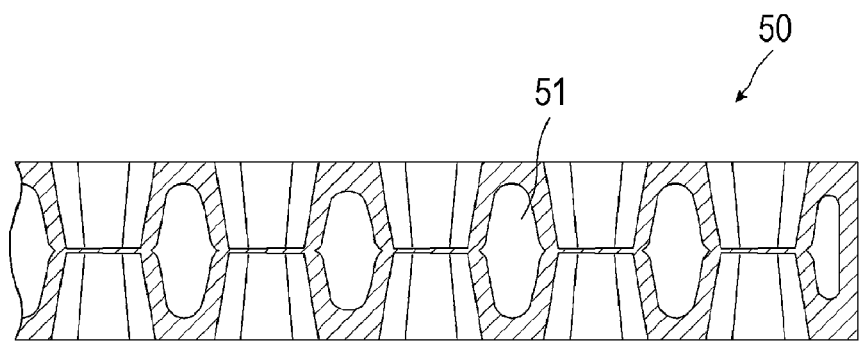
FIG. 20 is a sectional view illustrating a molded foam product manufactured according to the conventional method for manufacturing a molded foam.

FIGS. 19A, 19B and 19C are schematic views each illustrating the attaching step in the method for manufacturing a molded foam according to the eighth embodiment.

As illustrated in FIG. 19A, in the attaching step, a pair of swingable prepinches 122 are provided below the extrusion outlet. The prepinches 122 press and pinch the outer wall surface 120b of the extruded cylinder-shaped foamed parison 120. Thus, as illustrated in FIG. 19B, the facing portions of the inner wall surface 120a of the cylinder-shaped parison 120 are closely attached to each other.

Then, by the prepinches 122 swinging intermittently, as illustrated in FIG. 19C, the facing portions of the inner wall surface 120a of the cylinder-shaped parison 120 are closely attached to each other.

While the seventh and the eighth embodiments according to the present invention have been described above, the present invention is not particularly limited to these embodiments.

For example, according to the method for manufacturing a molded foam of the seventh and the eighth embodiments, the cylinder-shaped foamed parison is used to manufacture the molded foam. However, it is possible to use a plurality of (e.g., two) sheet-shaped foamed parisons.

In this case, the method for manufacturing a molded foam includes the extruding step of forming sheet-shaped foamed parisons in a sheet shape by extruding the resin blend containing the foaming agent and the thermoplastic resin, the attaching step of forming the foamed parison laminated body by closely attaching facing inner wall surfaces of the plurality of sheet-shaped foamed parison, the mold clamping step of sealing and mold clamping the foamed parison laminated body by transferring and clamping the foamed parison laminated body between the split mold blocks, and the sucking step of sucking the air between the split mold blocks to reduce the pressure between the split mold blocks. In this case, the sucking in the attaching step of sucking the air between the inner wall surfaces of the sheet-shaped foamed parisons is not performed.

Further, it is not necessary to transfer and mold the extruded foamed parisons between the split mold blocks. It is possible to provide the foamed parison molded body after the foamed parisons are cooled and solidified after the extrusion, and then, re-heat the foamed parison molded body to unsolidify into the foamed parisons, and to transfer and mold the foamed parisons between the split mold blocks.

While, according to the method for manufacturing a molded foam of the seventh and the eighth embodiments, the split mold blocks 113 are provided with the protuberances 113a, the protuberances 113a may not be provided.

While, according to the method for manufacturing a molded foam of the seventh and the eighth embodiments, the air between the inner wall surfaces of the foamed parisons is sucked in the attaching step, this sucking may not be performed.

Further, while the air is blown between the split mold blocks through the air inlets provided for the split mold blocks in the mold clamping step, this blowing may not be performed as well.

(Functional Effects)

The method for manufacturing a molded foam according to the present invention includes the attaching step in which the facing portions of the inner wall surface of the foamed parison are reliably closely attached to each other to form the foamed parison laminated body. Thus, it is possible to suppress the generation of the hollow part. Consequently, the molded foam obtained by the method for manufacturing a molded foam is reduced in weight and is excellent in strength. Further, according to the method for manufacturing a molded foam, the portions of the inner wall surface that are laminated in the mold clamping step are not easily separated by performing the attaching step. Consequently, it is possible to make the entire molded foam to have a sufficient foaming state as the expansion ratio can be increased. Thus, it is possible to further reduce the weight of the molded foam.

According to the method for manufacturing a molded foam of the present invention, it is also possible that, in the attaching step, the facing portions of the inner wall surface of the foamed parison are closely attached to each other by pressing the foamed parison by sliding a slide core to form the foamed parison laminated body. In this case, a width by which the foamed parison is clamped can be freely adjusted by adjusting a sliding condition of the slide core.

According to the method for manufacturing a molded foam of the present invention, it is also possible that, in the attaching step, the foamed parison laminated body is formed by closely attaching the facing portions of the inner wall surface of the foamed parison to each other by clamping the foamed parison by the split mold blocks and pressing the foamed parison by a protuberance provided for the mold block and, at the same time, in the mold clamping step, the foamed parison laminated body is sealed and mold-clamped by clamping the foamed parison laminated body by the split mold blocks. In this case, the protuberances of the split mold blocks serve to form recesses in a surface of the molded foam, as well as to closely attach the facing portions of the inner wall surface of the molded foam to each other. Consequently, it is possible to manufacture the molded foam in which the recesses are formed in its surface with a simple configuration.

Further, in this case, it is possible to reduce a manufacturing cost as the attaching step and the mold clamping step are performed at the same time.

The method for manufacturing a molded foam of the present invention can use a cylinder-shaped foamed parison in a cylindrical shape and further include a deforming step of deforming the cylinder-shaped foamed parison into a flat shape. In this case, it is possible to facilitate the close attachment between the facing portions of the inner wall surface of the cylinder-shaped foamed parison in the attaching step.

Moreover, it is possible to perform the attaching step and the mold clamping step at the same time. In this case, it is possible to decrease the time period from the outer wall surface of the cylinder-shaped foamed parison and the split mold blocks are first brought into contact with each other until the outer wall surface of the cylinder-shaped foamed parison and the split mold blocks are fully brought into contact with each other. Here, if this time period is long, a portion of the foamed parison at the center of the mold which is first brought into contact tends to be thick, and portions of the foamed parison at the both end portions of the molds which are last brought into contact (the both end portions in the horizontal direction) tend to be thin.

Therefore, according to the method for manufacturing a molded foam, it is possible to prevent the molded foam from being partially thin, and thus it is possible to suppress the generation of the hollow part.

According to the method for manufacturing a molded foam of the present invention, it is also possible that, in the deforming step, the deformation of the cylinder-shaped parison into the flat shape by expanding the parison in the diameter direction is performed by inserting a pair of rod-shaped members into the cylinder-shaped foamed parison and then moving the rod-shaped members respectively in directions opposite to each other. In this case, it is possible to deform the cylinder-shaped foamed parison into the flat shape with a simple configuration.

According to the method for manufacturing a molded foam of the present invention, it is also possible that the cylinder-shaped foamed parison is deformed into the flat shape in the deforming step by guiding the cylinder-shaped foamed parison from inside by a pair of guiding members provided below an extrusion outlet. In this case, it is possible to deform the parison into the flat shape with a simple configuration.

According to the method for manufacturing a molded foam of the present invention, it is also possible that, in the deforming step, the cylinder-shaped parison is deformed into the flat shape by rollers. In this case, it is possible to deform the parison into the flat shape with a simple configuration.

According to the method for manufacturing a molded foam of the present invention, it is also possible that, in the attaching step, an air between the facing portions of the inner wall surface of the foamed parison is sucked. In this case, it is possible to improve the close attachment between the facing portions of the inner wall surface of the foamed parison.

According to the method for manufacturing a molded foam of the present invention, it is also possible that, in the mold clamping step, an air is blown into the split mold blocks through air inlets provided for the split mold blocks. In this case, it is possible to further improve the close attachment between the facing portions of the inner wall surface of the foamed parison.

According to the method for manufacturing a molded foam of the present invention, it is also possible that, in the attaching step, the facing portions of the inner wall surface of the foamed parison are closely attached to each other by sandwiching the foamed parison by a pair of pressure-attachment rollers to form the foamed parison laminated body. In this case, it is possible to suppress the generation of the hollow part more reliably.

Further, in this case, it is possible to closely attach the portions of the inner wall surface of the foamed parison to each other continuously over a wide area. Therefore, it is also possible to make a thickness of the foamed parison laminated body even.

According to the method for manufacturing a molded foam of the present invention, it is also possible that, in the attaching step, an air is blown to an outer wall surface of the foamed parison. Thus, as the outer wall surface is in a non-contact state (specifically, only the air is brought into contact with the outer wall surface), it is possible to reliably suppress the generation of the hollow part without breaking the cells.

Further, it is possible to prevent the foamed parison from attaching to the pressure-attachment rollers and the like.

It is preferable that a temperature of the air blown in the attaching step be higher than a temperature of the foamed parison. In this case, it is possible to prevent the foamed parison from being cooled and solidified, and therefore to improve the moldability.

Regarding the industrial applicability, the molded foam obtained by the method for manufacturing a molded foam according to the present invention can be utilized in the molding of ducts, containers, automotive components, and the like. Further, the molded foam according to the present invention can be suitably used as foam core materials. Specifically, the molded foam is used for structural members having a high flexure strength or resistant to flexural buckling for automobiles, aircrafts, vehicles and ships, architectural materials, electrical appliance housings, sports and leisure products, and the like. Such a molded foam is lightweight and excellent in strength.

When the invention has been illustrated and described in detail, the forgoing description is in all aspects illustrative and not restrictive. It is therefore understood that numerous modifications and variations can be devised without departing from the spirit and scope of the invention.

What is claimed is:

1. A method of manufacturing a molded foam from a foamed parison, the method comprising:
    an extruding step of extruding a resin blend containing a foaming agent and a thermoplastic resin to form a foamed parison;
    a mold clamping and attaching step of closely attaching substantially entire surfaces of facing portions of an inner wall surface of the foamed parison to each other by clamping the foamed parison by split mold blocks and pressing the foamed parison by a protuberance provided on at least one of the mold blocks to form a foamed parison laminated body and seal the split mold blocks; and
    a sucking step of sucking the foamed parison from air inlets provided in the split mold blocks to reduce a pressure between the split mold blocks without parting the foamed parison after the mold clamping and attaching step.

2. The method according to claim 1, wherein
    in the mold clamping and attaching step, the facing portions of the inner wall surface of the foamed parison are closely attached to each other by clamping the foamed parison by the split mold blocks and pressing the foamed parison by sliding a slide core provided for the mold block to form the foamed parison laminated body.

3. The method according to claim 1, wherein in the mold clamping and attaching step,
    the foamed parison laminated body is formed by closely attaching the facing portions of the inner wall surface of the foamed parison to each other by clamping the foamed parison by the split mold blocks and pressing the foamed parison by the protuberance and, at the same time,
    the foamed parison laminated body is sealed and mold-clamped by clamping the foamed parison laminated body by the split mold blocks.

4. The method according to claim 1, wherein
    the foamed parison is a cylinder-shaped foamed parison in a cylinder shape.

5. The method for manufacturing a molded foam according to claim 1, wherein
    the foamed parison includes a pair of sheet-shaped foamed parisons in a sheet shape.

6. The method according to claim 4, further comprising:
    a deforming step of deforming the cylinder-shaped foamed parison into a flat shape, the deforming step being performed between the extruding step and the mold clamping and attaching step.

7. The method according to claim 6, wherein
    in the deforming step, the deformation is performed by inserting a pair of rod-shaped members into the cylinder-shaped foamed parison and moving the rod-shaped members respectively in directions opposite to each other.

8. The method for manufacturing a molded foam according to claim 6, wherein
    in the deforming step, the cylinder-shaped foamed parison is guided from inside by a pair of guiding members provided below an extrusion outlet.

9. The method according to claim 6, wherein
    in the deforming step, the cylinder-shaped parison is deformed into the flat shape by rollers.

10. The method according to claim 4, wherein
    in the mold clamping and attaching step, air between the facing portions of the inner wall surface of the foamed parison is sucked.

11. The method according to claim 1, wherein
    in the mold clamping and attaching step, air is blown into the mold through the air inlets in the mold blocks.

12. The method according to claim 1, wherein
    after the mold clamping and attaching step, the foamed parison laminated body is transferred between the split mold blocks.

13. The method according to claim 12, wherein
    in the mold clamping and attaching step, the facing portions of the inner wall surface of the foamed parison are closely attached to each other by sandwiching the foamed parison by a pair of pressure-attachment rollers to form the foamed parison laminated body.

14. The method according to claim 12, wherein
    in the mold clamping and attaching step, air is blown to an outer wall surface of the foamed parison laminated body.

15. The method according to claim 14, wherein
    a temperature of the air is higher than a temperature of the foamed parison laminated body.

16. A method of manufacturing a molded foam from a foamed parison, the method comprising:
    an extruding step of extruding a resin blend containing a foaming agent and a thermoplastic resin to form a foamed parison;
    an attaching step of closely attaching facing portions of an inner wall surface of the foamed parison to each other to form a foamed parison laminated body;
    a mold clamping step of sealing and mold clamping the foamed parison laminated body by clamping the foamed parison laminated body by split mold blocks; and
    a sucking step of sucking air between the split mold blocks to reduce a pressure between the split mold blocks
    wherein
    after the attaching step, the foamed parison laminated body is transferred between the split mold blocks, and
    in the attaching step, air is blown to an outer wall surface of the foamed parison laminated body.

17. The method according to claim 16, wherein
    a temperature of the air is higher than a temperature of the foamed parison laminated body.

* * * * *